United States Patent
Lu et al.

(10) Patent No.: US 12,449,010 B2
(45) Date of Patent: *Oct. 21, 2025

(54) FRICTION DISK AND BRAKE

(71) Applicant: ALTRA INDUSTRIAL MOTION (SHENZHEN) CO., LTD., Shenzhen (CN)

(72) Inventors: Cha Lu, Shenzhen (CN); Kongjian Wu, Shenzhen (CN); Atkesone Bernard, Shenzhen (CN)

(73) Assignee: Altra Industrial Motion (Shenzhen) Co., Ltd., Shenzhen (CN)

( * ) Notice: Subject to any disclaimer, the term of this patent is extended or adjusted under 35 U.S.C. 154(b) by 469 days.

This patent is subject to a terminal disclaimer.

(21) Appl. No.: 17/889,213

(22) Filed: Aug. 16, 2022

(65) Prior Publication Data
US 2023/0089531 A1 Mar. 23, 2023

Related U.S. Application Data

(63) Continuation of application No. PCT/CN2022/076702, filed on Feb. 17, 2022.

(30) Foreign Application Priority Data

Sep. 18, 2021 (CN) .......................... 202111112232.2
Sep. 18, 2021 (CN) .......................... 202122281383.2
Sep. 18, 2021 (CN) .......................... 202122282982.6

(51) Int. Cl.
*F16D 65/12* (2006.01)
*F16D 55/22* (2006.01)
*F16D 55/36* (2006.01)
*F16D 65/00* (2006.01)
*F16D 65/18* (2006.01)
*F16D 65/02* (2006.01)
*F16D 121/22* (2012.01)

(52) U.S. Cl.
CPC .......... *F16D 65/121* (2013.01); *F16D 55/22* (2013.01); *F16D 55/36* (2013.01);
(Continued)

(58) Field of Classification Search
CPC ...... F16D 65/18; F16D 59/02; F16D 2121/22; F16D 55/36; F16D 55/226; F16D 55/227;
(Continued)

(56) References Cited

U.S. PATENT DOCUMENTS 2,451,373 A * 10/1948 Beall .................... B61L 29/243
49/340
2,596,193 A * 5/1952 Zieg, Jr. .................. F16D 59/00
192/105 R
(Continued)

FOREIGN PATENT DOCUMENTS

AT 508579 A1 * 2/2011
CN 106090077 A 11/2016
(Continued)

*Primary Examiner* — Robert A. Siconolfi
*Assistant Examiner* — Mahbubur Rashid
(74) *Attorney, Agent, or Firm* — AP3 Law Firm PLLC

(57) ABSTRACT

The disclosure provides a friction disk and a brake including a magnetic yoke iron core, a first movable plate, a friction disk, a first coil, at least one second coil, an armature and an elastic part; the magnetic yoke iron core includes a first mounting space, a second mounting space and at least one third mounting space distributed coaxially; the first movable plate is located in the first mounting space and close to a first shaft end; the friction disk is located in the first mounting space; the first coil is arranged in the second mounting space; the at least one second coil correspondingly is arranged in the at least one third mounting space; the armature is located at the second shaft end; the elastic part has a pre-tightening force that enables the armature to be far away from the magnetic yoke iron core.

15 Claims, 17 Drawing Sheets

(52) U.S. Cl.
CPC ..... *F16D 65/0006* (2013.01); *F16D 65/0031* (2013.01); *F16D 65/186* (2013.01); *F16D 2065/1312* (2013.01); *F16D 2065/1348* (2013.01); *F16D 2121/22* (2013.01)

(58) Field of Classification Search
CPC .. F16D 65/186; F16D 65/097; F16D 25/0638; F16D 55/22; F16D 55/2262; F16D 2121/20; F16D 55/2265; F16D 65/14; F16D 2129/08; F16D 2121/16; F16D 2065/386; F16D 2055/005; F16D 13/52; F16D 2055/0033; F16D 2065/1392; F16D 13/69; F16D 2065/1348; F16D 2065/1316; F16D 2125/582; F16D 67/06; F16D 57/002; F16D 2065/1312; F16D 2200/0056; F16D 2129/06; F16D 2129/10; F16D 23/14; F16D 27/115; F16D 43/216; F16D 55/04; F16D 63/002; F16D 65/0006; F16D 65/0031; F16D 65/121
See application file for complete search history.

(56) References Cited

U.S. PATENT DOCUMENTS

| | | | | | |
|---|---|---|---|---|---|
| 2,718,294 | A | * | 9/1955 | Armstrong | F16D 43/18 192/105 BA |
| 3,326,343 | A | * | 6/1967 | Stuckens | F16D 27/112 192/84.96 |
| 4,476,965 | A | * | 10/1984 | Brown, Jr. | F16D 59/02 188/72.3 |
| 4,892,175 | A | * | 1/1990 | Van Erden | F16D 43/18 192/104 C |
| 5,185,542 | A | * | 2/1993 | Lazorchak | F16D 59/02 310/105 |
| 5,988,327 | A | * | 11/1999 | Snyder | B60T 13/04 188/171 |
| 6,459,182 | B1 | * | 10/2002 | Pfann | H02K 7/1025 188/161 |
| 6,675,940 | B2 | * | 1/2004 | Maurice | B60T 13/04 188/72.9 |
| 10,612,610 | B2 | * | 4/2020 | Silvestrini | F16D 55/08 |
| 2003/0057037 | A1 | * | 3/2003 | Maurice | B60T 7/107 188/171 |
| 2006/0169550 | A1 | * | 8/2006 | Albrecht | F16D 55/02 188/73.1 |

FOREIGN PATENT DOCUMENTS

| | | | |
|---|---|---|---|
| CN | 207018398 U | * | 2/2018 |
| CN | 208010803 U | | 10/2018 |
| CN | 209100533 U | | 7/2019 |
| CN | 110255418 A | | 9/2019 |
| CN | 110873135 A | | 3/2020 |
| CN | 112628308 A | | 4/2021 |
| JP | 2001027267 A | | 1/2001 |
| JP | 2021110441 A | | 8/2021 |

* cited by examiner

FRICTION DISK AND BRAKE

CROSS-REFERENCE TO RELATED APPLICATIONS

This application is a continuation of International Application No. PCT/CN2022/076702, filed on Feb. 17, 2022, which claims priority to Chinese Patent Application No. 202111112232.2, No. 202122281383.2 and No. 202122282982.6, filed on Sep. 18, 2021. The disclosures of the aforementioned applications are hereby incorporated by reference in their entireties.

TECHNICAL FIELD

The present application relates to the technical field of brake, in particular to a friction disk and a brake.

BACKGROUND

The brake structure is mainly divided into open type and closed type. In the structure of closed brake, the magnetic yoke and tail plate are combined to form a closed shell, and most of the other parts (armature, friction disk, etc.) are located in the closed shell. When powered on, the magnetic yoke generates magnetic force under the excitation of the coil to attract the armature, and the armature is separated from the friction disk. When the power is cut off, the magnetic force on the armature disappears, and the two ends of the friction disk are pressed against the armature and the tail plate respectively to complete the braking process.

Each friction disk has two friction surfaces (i.e. two shaft end surfaces). When the friction disk works, both shaft end surfaces rub with external objects to generate braking force, but the braking capacity is relatively low.

In addition, electromagnetic brake is a widely used device. The traditional electromagnetic brake adopts the stacking assembly method, that is, the main components of the electromagnetic brake, including a magnetic yoke, an armature, a friction disk and a tail plate and so on, are stacked along the axial direction of the braked shaft. This assembly method leads to the large axial thickness of the traditional electromagnetic brake. However, with the emergence of some adverse factors (for example, the installation space becomes smaller), users have higher and higher expectations for thinning the thickness of the electromagnetic brake. Especially in some special applications, the use environment requires that the thickness of the electromagnetic brake must be very small, while the traditional electromagnetic brake cannot be used because of its large thickness.

FIG. 20 is a structural diagram of an electromagnetic brake in the prior art. The brake includes a magnetic yoke 91, an armature 94, a friction disk 96 and a tail plate 95, which are stacked in turn along the axis X direction of the braked shaft. The working principle of the electromagnetic brake shown in FIG. 20 is as follows:

The braked shaft is connected with the friction disk 96 through a shaft sleeve 97, and the friction disk 96 rotates coaxially with the braked shaft. When the friction disk 96 is clamped by the armature 94 and the tail plate 95, the friction disk 96 rubs against the armature 94 and the tail plate 95 to generate a braking force. Under the action of the braking force, the braked shaft stops rotating together with the friction disk 96 to realize braking. When the friction disk 96 is released (that is, the friction disk 96 is not clamped by the armature 94 and the tail plate 95), the friction disk 96 will not rub against the armature 94 and the tail plate 95, and no braking force will be generated. When there is no braking force, the braked shaft can rotate freely.

The tail plate 95 is connected to the magnetic yoke 91 through a threaded connector 98 and a sleeve 99 and remains relatively fixed. The armature 94 can move axially, thereby changing the distance M between the tail plate 95 and the armature 94. When the distance M increases, the friction disk 96 is released and the braked shaft can rotate freely. When the distance M decreases, the friction disk 96 is clamped to realize braking. The armature 94 moves axially through a coil 92 and a spring 93. When the coil 92 is not energized, the spring 93 pushes the armature 94 close to the tail plate 95, the distance M decreases, and the friction disk 96 is clamped. When the coil 92 is energized, a magnetic force is generated. Under the attraction of the magnetic force, the armature 94 overcomes the elastic force of the spring 93, approaches the magnetic yoke 91 and away from the tail plate 95, the distance M increases, and the friction disk 96 is released.

It can be clearly seen from FIG. 20 that the magnetic yoke 91, the armature 94, the friction disk 96 and the tail plate 95 are stacked in turn in the axis X direction. The thickness of the magnetic yoke 91, the armature 94, the friction disk 96 and the tail plate 95 form part of the overall thickness of the electromagnetic brake, and the overall thickness of the electromagnetic brake is large.

In order to reduce the overall thickness of the electromagnetic brake, the traditional practice is to reduce the thickness of the magnetic yoke 91, the armature 94, the friction disk 96 and the tail plate 95 as much as possible by using better materials and more refined processing technology. Although the overall thickness of the electromagnetic brake can be reduced and the problem of excessive thickness of the electromagnetic brake solved to a certain extent, but the following new problems will be caused:

(1) After the magnetic yoke 91 becomes thinner, the space containing the coil 92 becomes smaller, resulting in a reduction in the volume of the coil 92. After the volume of coil 92 decreases, the magnetic field decreases and the heating power of coil 92 increases.

(2) After the friction pair parts (i.e., the armature 94, the friction disk 96 and the tail plate 95) become thinner (the diameter thickness ratio increases), at least the following four problems will occur. Firstly, the rigidity of the parts is weakened, and the parts are prone to creep or stress deformation. Secondly, the materials of parts become less, the heat capacity decreases, the temperature of parts rises rapidly in the process of friction, and the braking torque attenuation is easy to occur. Rapid temperature rise of parts will also lead to thermal stress and deformation. In serious cases, the parts may be completely damaged and the brake may be scrapped. Thirdly, the extremely thin friction pair parts will amplify the noise (similar to the function of horn diaphragm) or make the noise sharper during friction. Fourthly, after the thickness of friction disk 96 is reduced, the structural strength is insufficient and the processing difficulty increases. The perpendicularity between the middle hole of the friction disk 96 and the friction surface becomes worse. Moreover, the fitting length between the middle hole of the friction disk 96 and the braked shaft or shaft sleeve 97 becomes smaller. The friction disk 96 is prone to oscillate during rotation, making abnormal noise and increasing the drag torque. When rotating at high speed, the friction surface of the friction disk 96 is easy to be locally ablated, so as to reduce the friction torque and affect the braking effect.

SUMMARY

These and other problems are generally solved or circumvented, and technical advantages are generally achieved, by embodiments of the present application which provide a friction disk and a brake.

TECHNICAL PROBLEMS

The present application provides a friction disk and a brake, which aims to solve the problems of low braking capacity of the friction disk and large thickness of the brake without causing new problems.

TECHNICAL SOLUTIONS

In order to solve the above problems, the present application provides a friction disk including an elastic component and a plurality of friction monomers; the plurality of friction monomers are distributed in an annular array and enclosed to form a central space, each of the plurality of friction monomers having a freedom to approach or move away from the central space along a radial direction of the annular array, the elastic component being respectively connected with the plurality of friction monomers, and the elastic component being configured with a pre-tightening force to make the plurality of friction monomers close to the central space.

On the other hand, the friction disk comprises a plurality of unit blocks and a plurality of first elastic parts. The plurality of unit blocks are distributed in an annular array around a central line and enclosed to form a central space; each unit block has a freedom close to or away from the central space along a radial direction of the annular array; and each of the first elastic parts is connected to the unit block and has a preload to make the unit block close to the central space.

In order to solve the above problems, the application also provides a brake including the above friction disk, a magnetic yoke iron core, a first movable plate, a first coil, at least one second coil, an armature and an elastic part.

The magnetic yoke iron core comprises a first mounting space and a second mounting space distributed sequentially and concentrically from inside to outside of the magnetic yoke iron core, the first mounting space penetrating through a center position of the magnetic yoke iron core in an axial direction of the magnetic yoke iron core, an opening of the second mounting space facing a second shaft end of the magnetic yoke iron core, the magnetic yoke iron core further comprising at least one third mounting space coaxially arranged with the second mounting space, and an opening of the at least one third mounting space facing the second shaft end of the magnetic yoke iron core; the first movable plate is located in the first mounting space and close to a first shaft end of the magnetic yoke iron core, the first shaft end being an opposite end of the second shaft end, and the friction disk being located in the first mounting space and being located at a side of the first movable plate close to the second shaft end; the first coil is arranged in the second mounting space; at least one second coil is correspondingly arranged in the at least one third mounting space; the armature is located at the second shaft end of the magnetic yoke iron core, the armature being connected with the first movable plate through at least one connector, the at least one connector passing through the magnetic yoke iron core and being slidably matched with the magnetic yoke iron core, and the armature being configured to drive the first movable plate to move along the axial direction of the magnetic yoke iron core; and the elastic part is arranged between the armature and the magnetic yoke iron core, the elastic part having a pre-tightening force that enables the armature to be far away from the magnetic yoke iron core.

On the other hand, the application also provides a brake including the above friction disk, a magnetic yoke iron core, a first movable plate, a first coil, at least one second coil, an armature and a second elastic part.

The magnetic yoke iron core has a preset thickness, the center line passing through the magnetic yoke iron core along the thickness direction of the magnetic yoke iron core coincides with the axis of the braked shaft. The magnetic yoke iron core is concentrically distributed with a first mounting space, a second mounting space and at least one third mounting space from a center to an edge. The first mounting space passes through the middle of the magnetic yoke iron core along the thickness direction.

The first movable plate and the friction disk are located in the first mounting space, so that the overall thickness of the brake is not increased. The first movable plate and the friction disk are placed into the first mounting space from the first side of the magnetic yoke iron core. The first coil and the second coil are respectively located in the second mounting space and the third mounting space.

The armature is located on the second side of the magnetic yoke iron core. The second side and the first side are different sides along the thickness direction of the magnetic yoke iron core. The armature and the first movable plate are connected with each other through a connector. The connector penetrates the magnetic yoke iron core along the thickness direction and slides with the magnetic yoke iron core. The armature can drive the first movable plate to move along the thickness direction.

The second elastic part is installed on the magnetic yoke iron core. The second elastic part acts on the armature and has an elastic force to move the armature to the second side.

In the braking state, the first coil and the second coil are not energized, the armature is acted by the elastic force to drive the first movable plate to move to the second side, and the first movable plate compresses the friction disk and prevents the friction disk from rotating.

In the non-braking state, the first coil and the second coil are energized, and the armature is driven by magnetic force to overcome the elastic force and drive the first movable plate to move to the first side, so that the first movable plate is separated from the friction disk and the rotation of the friction disk is relieved.

ADVANTAGEOUS EFFECTS OF THE DISCLOSURE

Compared with the prior art, the friction disk provided by the present application adopts a split structure, that is, the disk body is composed of a plurality of friction monomers. When the rotational speed of the friction disk exceeds a certain value, each friction monomer will move away from the center in the radial direction under the action of centrifugal force and reach a preset position. After the friction monomer reaches the preset position, its side away from the center can rub against the magnetic yoke iron core of the brake to generate braking force. Existing friction disks have at most two surfaces that act as friction surfaces for working surfaces. In the brake provided by the present application, not only the two surfaces can be used as friction surfaces, but also the outer peripheral surface can be used as friction surfaces, thereby generating additional braking force and optimizing the braking effect.

Compared with the prior art, the brake provided in this application not only has the required braking capacity, but also improves the layout of parts. The magnetic yoke iron core has a first mounting space. Friction disks and movable plates are located in the first mounting space, rather than stacking in the thickness direction of the brake, so as to achieve the purpose of brake thickness thinning.

BRIEF DESCRIPTION OF THE DRAWINGS

In order to more clearly illustrate the technical solutions in the embodiments of the present application, the drawings used in the embodiments or the prior art description will be briefly described below, and it is obvious that the drawings in the following description are only some embodiments of the present application, and that other drawings can be obtained from these drawings without involving any inventive effort for a person skilled in the art.

Figure 1:
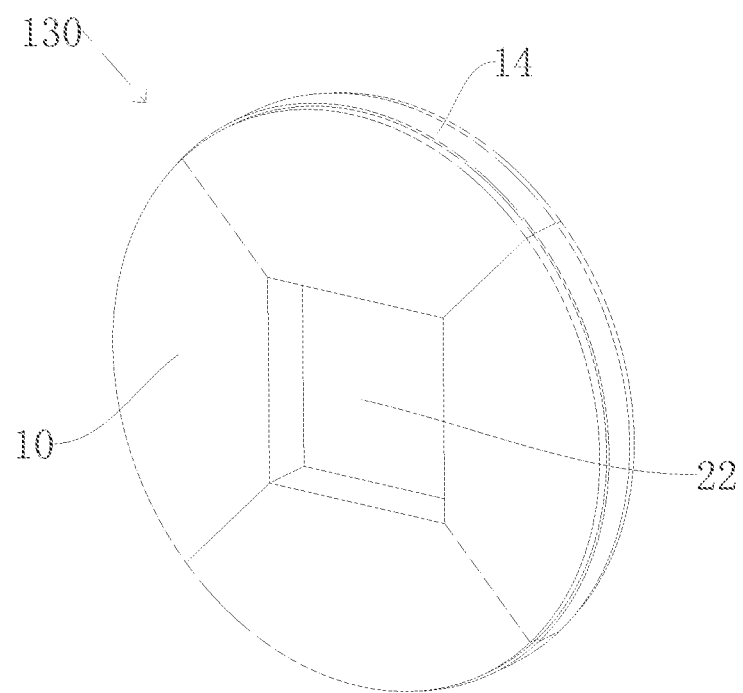
FIG. 1 is a schematic three-dimensional structural diagram of the friction disk provided by one embodiment of the present application.

10-friction monomer; 11-first accommodating groove; 12-chute; 13-second accommodating groove; 14-boss; 20-elastic component; 21-first tension spring; 22-central space; 23-second tension spring; 24-guide element; 25-fixed frame; 30-shaft sleeve; 110-magnetic yoke iron core; 111-first mounting space; 112-second mounting space; 113-extending portion; 114-connecting hole; 115-mounting hole; 116-blind hole; 117-positioning slot; 118-wiring opening; 119-third mounting space; 120-first movable plate; 121-locating block; 122-second movable plate; 123-clamping slot; 124-mounting area; 130-friction disk; 140-first coil; 141-second coil; 150-armature; 160-elastic part; 180-connector; 181-connecting part; 182-guide pole; 183-guide slot.

DETAILED DESCRIPTION OF ILLUSTRATIVE EMBODIMENTS

In order to make the technical problems, technical solutions and beneficial effects clearer, the application is further described in detail below in combination with the attached drawings and embodiments. It should be understood that the specific embodiments described herein are only used to explain the application and are not used to limit the application.

With reference to FIG. 1-FIG. 8, the friction disk provided by embodiments of this application is now described. The friction disk 130 includes an elastic component 20 and a plurality of friction monomers 10. The plurality of friction monomers 10 are distributed in an annular array around the axis of the magnetic yoke iron core 110 and enclosed to form a central space 22. Each the friction monomer 10 has a freedom to approach or move away from the central space 22 along a radial direction of the magnetic yoke iron core 110, and the elastic component 20 is respectively connected with the plurality of friction monomers 10; the elastic component 20 is configured with a pre-tightening force to make each the friction monomer 10 close to the central space 33.

Figure 4:
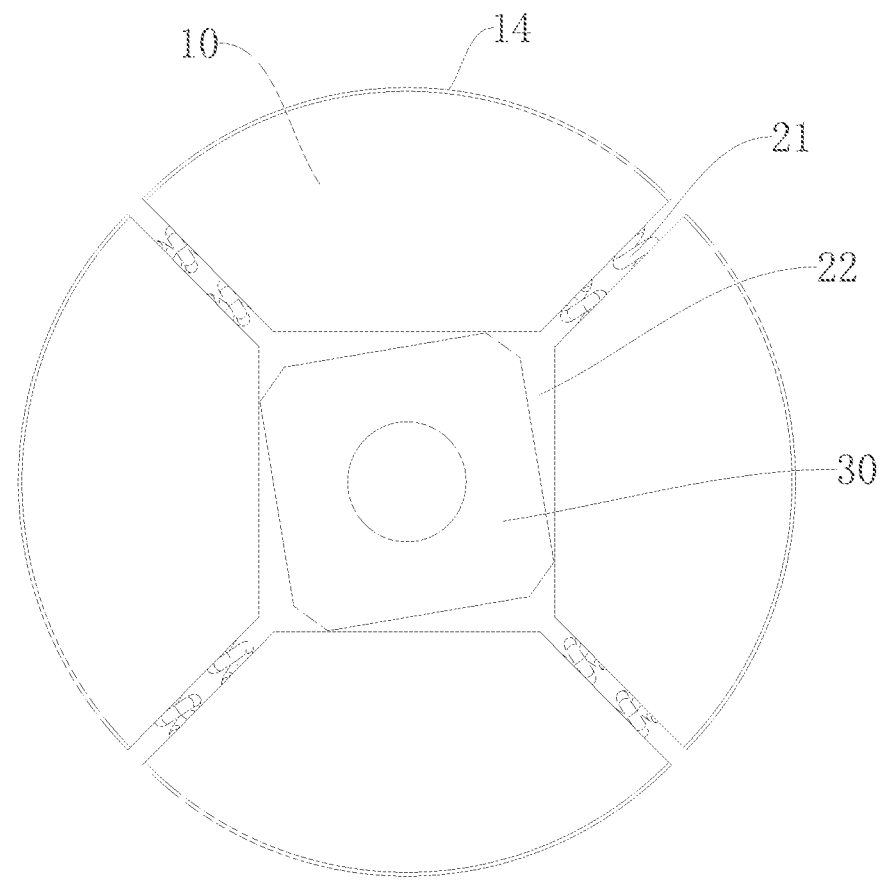
FIG. 4 is a schematic use state diagram of the friction disk provided by one embodiment of the present application.
Figure 8:
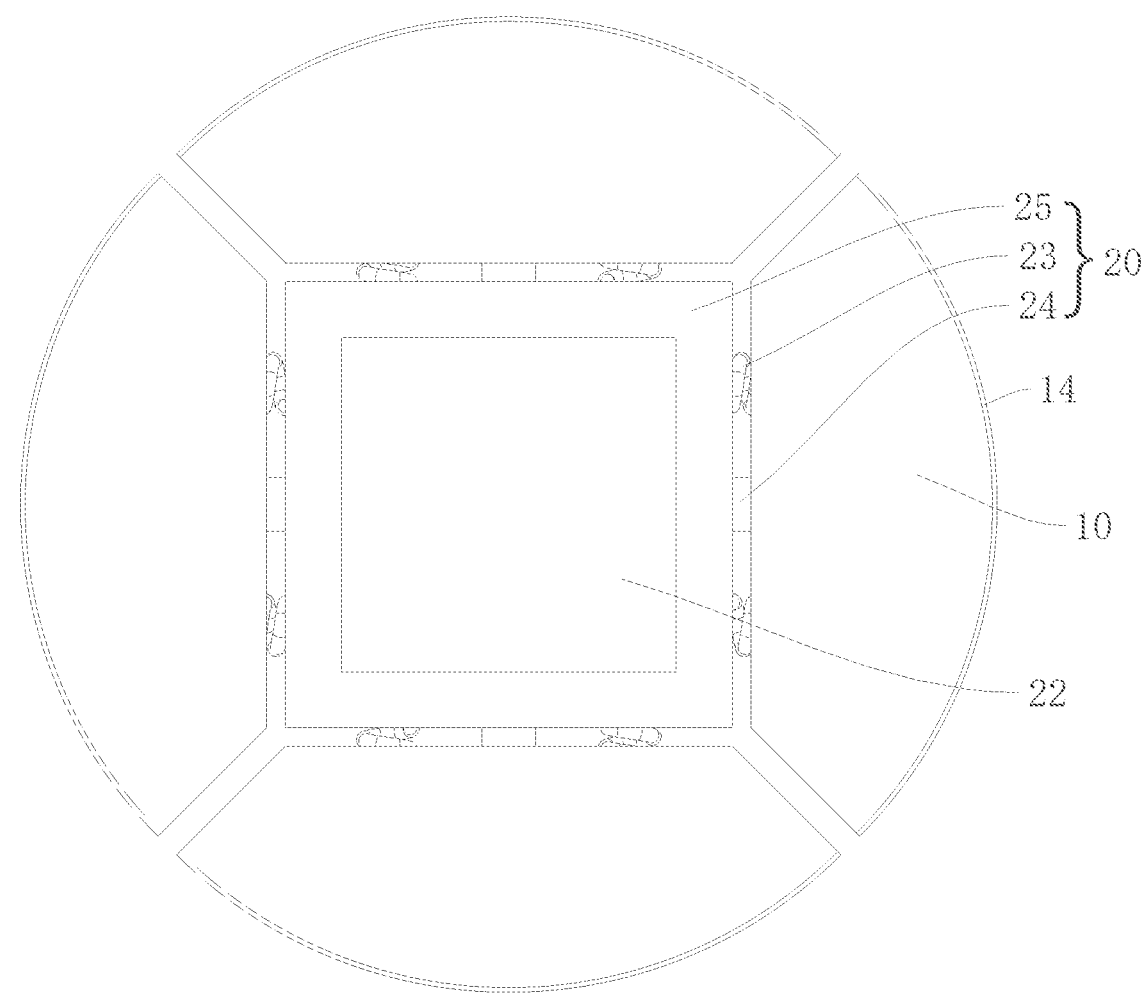
FIG. 8 is a schematic use state diagram of the friction disk provided by one embodiment of the present application.
Figure 9:
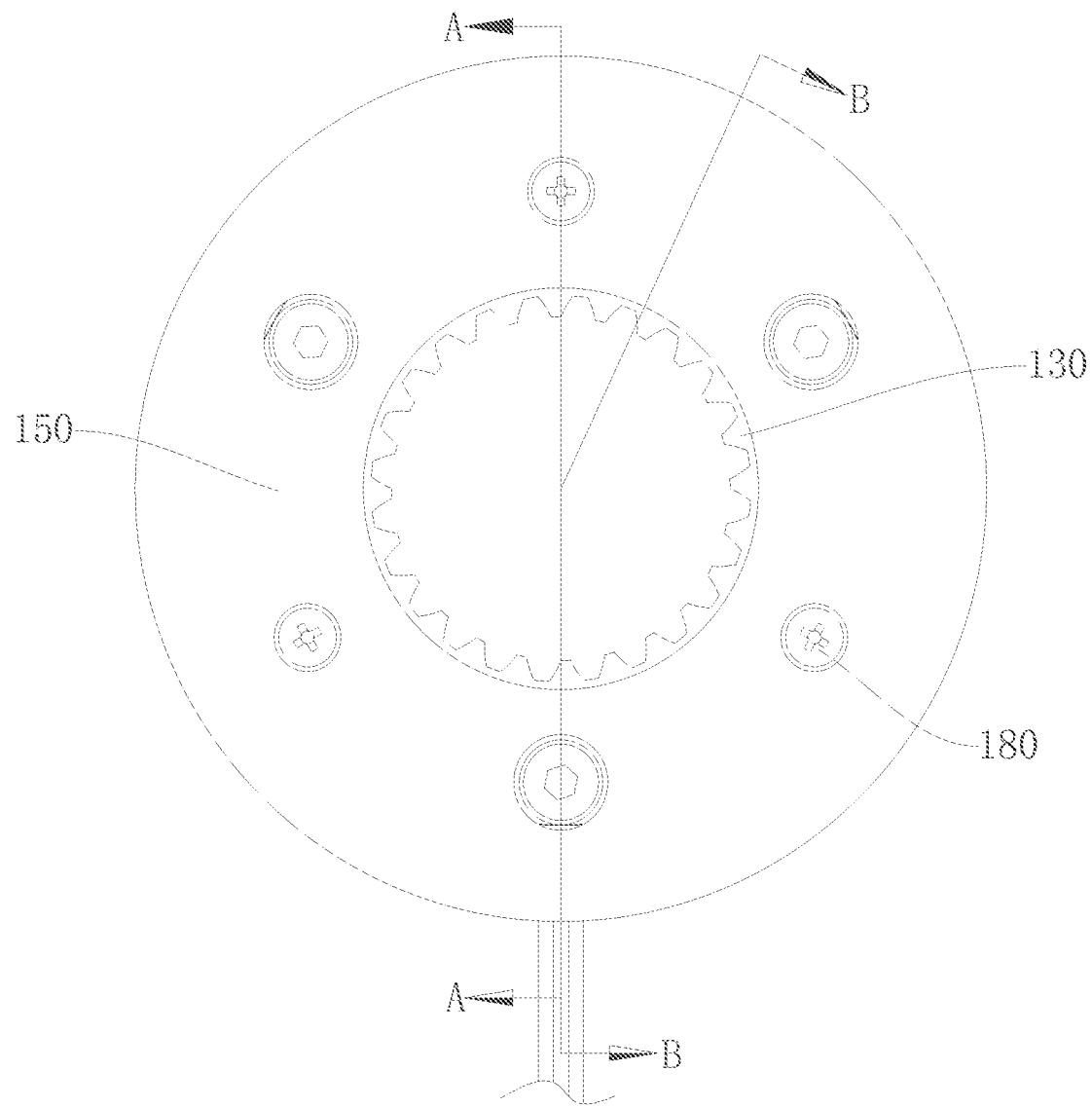
FIG. 9 is a schematic front structural diagram of the brake provided by one embodiment of the present application.
Figure 10:
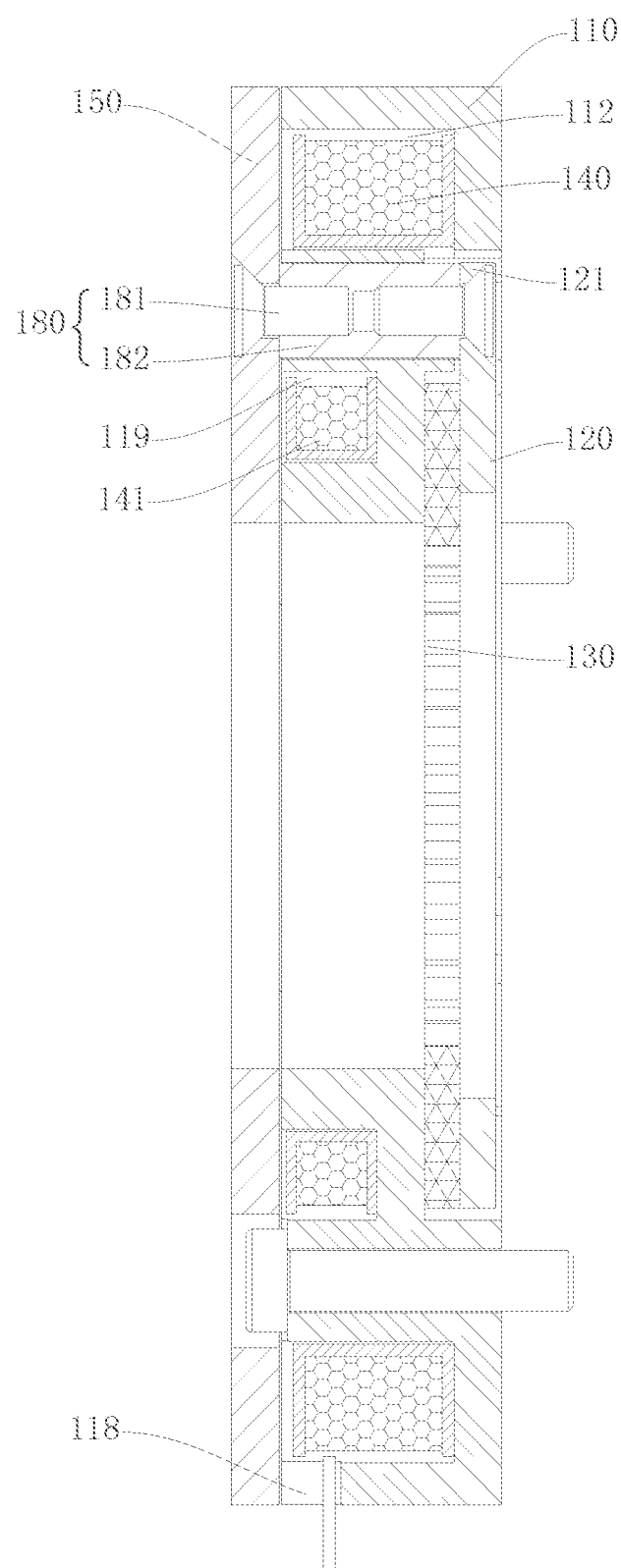
FIG. 10 is schematic sectional structural diagram along line A-A of FIG. 9.
Figure 11:
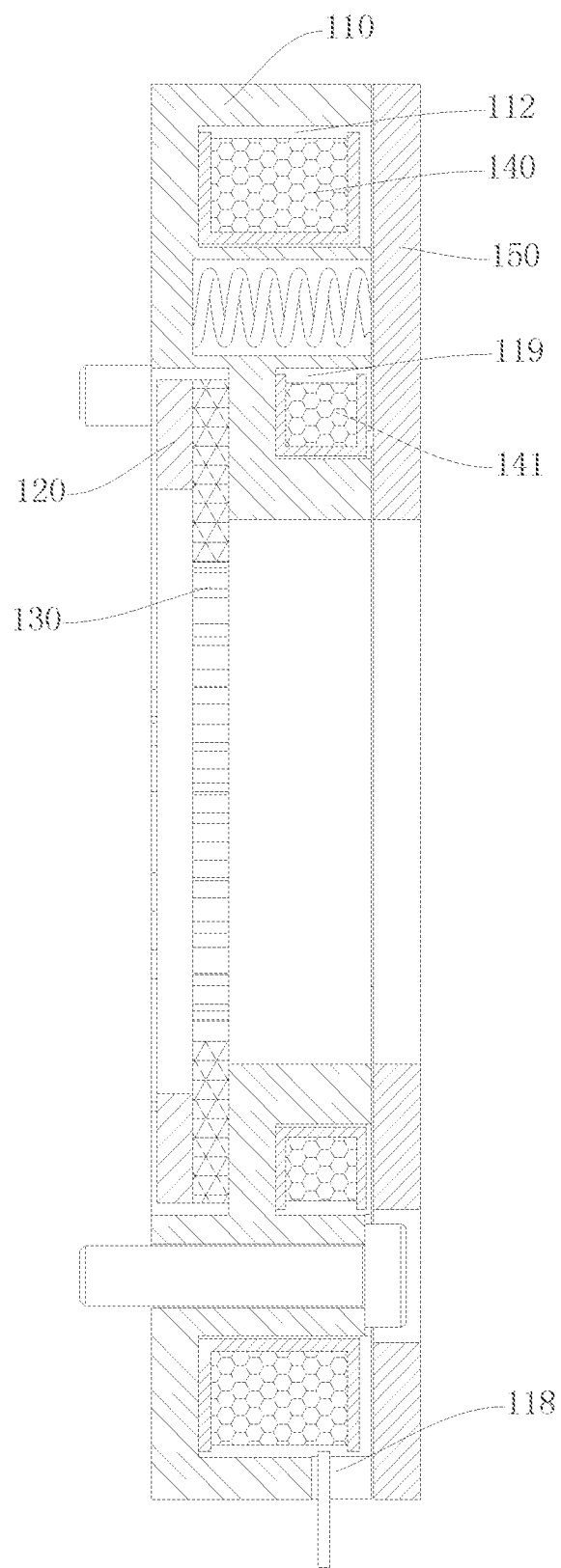
FIG. 11 a schematic sectional structural diagram along line B-B of FIG. 9.
Figure 12:
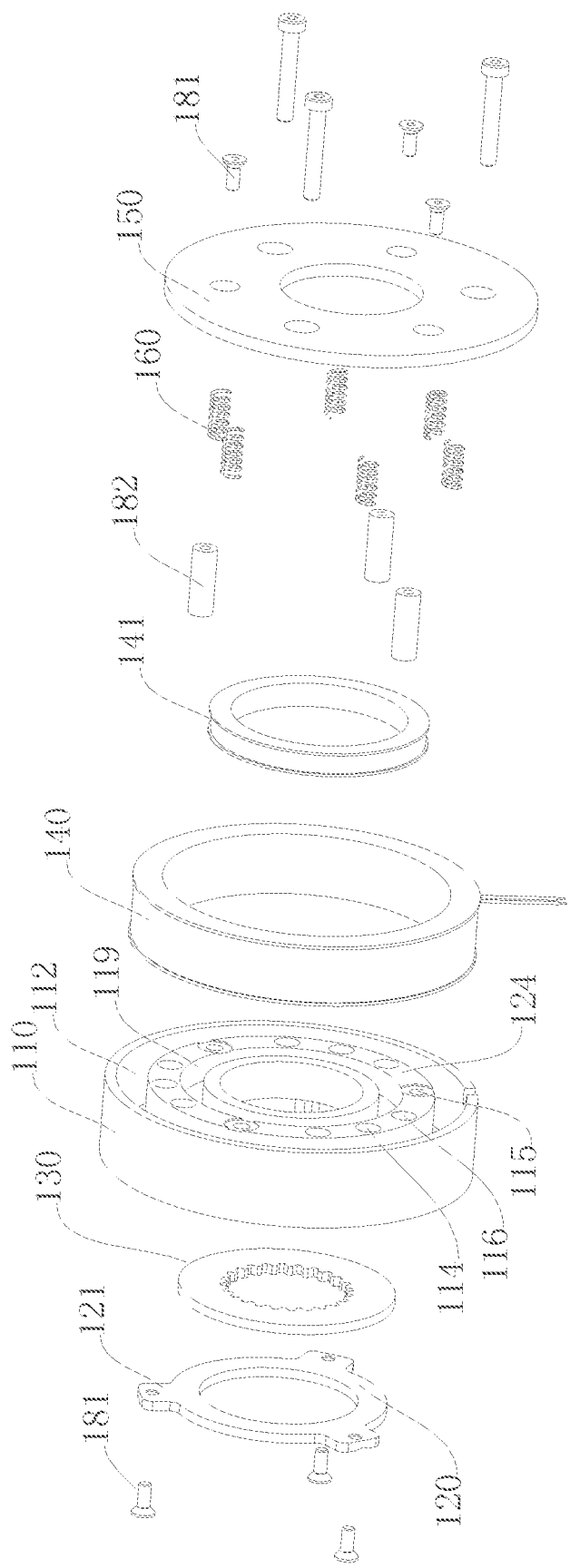
FIG. 12 is a schematic explosive structural diagram 1 of the brake provided by one embodiment of the present application.

It should be noted that there are two cases when the friction monomer 10 is close to the central space 22: the first case is as shown in FIG. 8, the elastic component 20 pulls the friction monomer 10 on one side of the friction monomer 10 close to the central space 22; in the second case, as shown in FIG. 4, the elastic component 20 pulls the friction monomer 10 on one side of the friction monomer 10 close to the adjacent friction monomer 10, so that the adjacent two friction monomers 10 are close to each other.

In the initial state, each friction monomer 10 is close to each other. When the rotational speed of the friction disk 130 exceeds the preset value (within or beyond the allowable rotational speed), the centrifugal force generated by the friction monomer 10 overcomes the pre-tightening force of the elastic component 20, and the friction monomer 10 moves away from the central space 22 along the radial direction of the annular array. At this time, the two adjacent friction monomers 10 will be separated from each other to produce a gap, the overall outer diameter of the friction disk 130 increases, and the outer arc surface of the friction monomer 10 contacts the inner wall of the magnetic yoke iron core 110 to produce friction and braking.

The traditional friction disk is an integrated structure. The friction disk 130 provided in this embodiment is a split structure, that is, the friction disk 130 is composed of a plurality of friction monomers 10. The plurality of friction monomers 10 are separated from each other at a certain speed for the friction disk 130 provided by this embodiment by using the split structure, so as to increase the overall outer diameter of the friction disk 130 and the outer arc surface of the friction monomer 10 can participate in friction as a working surface. The friction can provide additional braking force when the friction disk 130 (and the braked shaft) rotates at high speed, which enhances the reliability of the brake. The above additional braking force can not only increase the original braking force (i.e. the braking force generated by plane friction on both sides), but also replace the original braking force to realize braking in case of brake failure and failure to generate the original braking force, so as to have a better braking effect.

It should be noted that the friction monomer 10 may also be referred to as a unit block. Generally, the friction disk 130 is in a round cake shape and has a certain thickness. The friction disk 130 is generally coaxial with the braked shaft, that is, the axes of the two coincide. The elastic component 20 is respectively connected with a plurality of friction monomers 10, which means that the elastic component 20 includes a plurality of elastic parts, and the plurality of elastic parts are respectively connected with the friction monomers 10. In addition, the displacement of each friction monomer 10 is the same and the outer arc surface of each friction monomer 10 is located on the same cylindrical surface in the process of away from the central space 22 and separation. The cylindrical surface is coaxial with the friction disk 130, and the radius of the cylindrical surface changes with the movement of the friction monomer 10.

Figure 2:
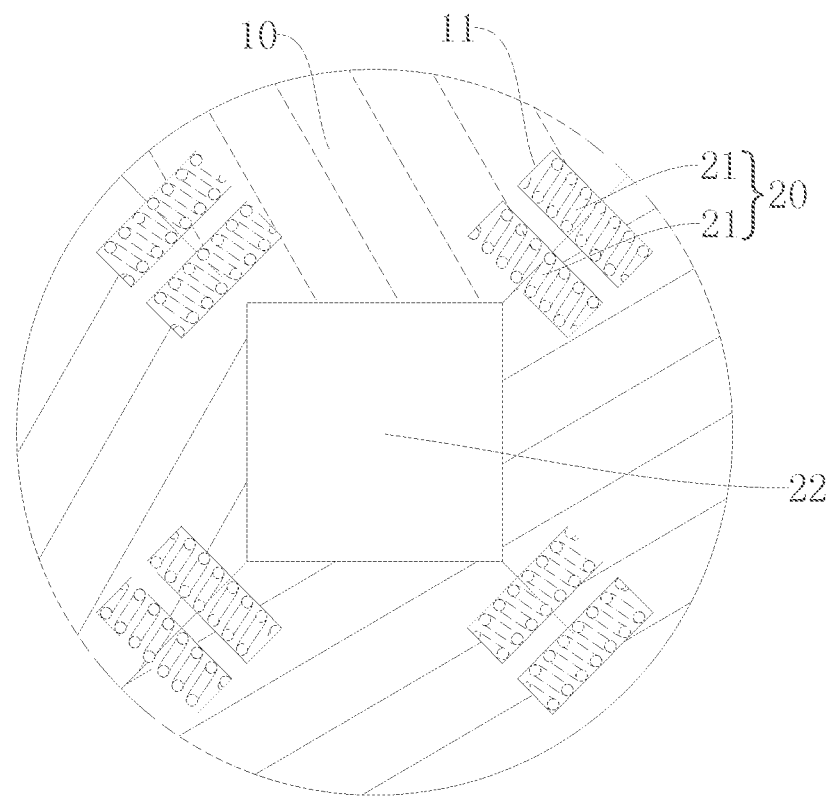
FIG. 2 is a schematic sectional structural diagram of the friction disk provided by one embodiment of the present application.

In some embodiments, the elastic component 20 may adopt the structure shown in FIG. 1, FIG. 2 and FIG. 4. Refer to FIG. 1, FIG. 2 and FIG. 4, the elastic component 20 includes a plurality of first tension spring groups, and each of the plurality of first tension spring groups is connected between two adjacent friction monomers 10. Each first tension spring group includes at least one first tension spring 21. The central space 22 forms a space for adapting a shaft sleeve. Each first tension spring 21 is fixed between two adjacent friction monomers 10. The number of the first tension springs 21 included in each first tension spring group is unlimited. For example, two adjacent friction monomers 10 may be connected through one first tension spring 21 or two first tension springs 21 (that is, one first tension spring group includes two first tension springs 21). The number of the first tension springs 21 needs to take into account the strength of the structure and the corresponding speed when the friction monomer 10 is separated. The first tension spring 21 is used to connect the adjacent friction monomers 10, so that all the friction monomers 10 form a friction disk 130 as a whole in this embodiment. The overall structure of the friction disk 130 is simple and easy to assemble.

It can be understood that the first tension spring 21 may not protrude from the two end faces of the friction monomer 10 along the axial direction of the annular array, otherwise it will affect the two shaft end surfaces (two side surfaces) of the friction disk 130 to participate in friction as the working surface.

In this embodiment, the two ends of each first tension spring 21 are respectively connected with two adjacent friction monomers 10. The stress analysis of a single friction monomer 10 is carried out, and its two sides are pulled by the first tension spring 21 respectively. The pulling force has two components, one is the radial force pointing to the circle center, and the other is the circumferential force perpendicular to the radial force. For the first tension springs 21 on different sides of the friction monomer 10, their circumferential forces are equal and opposite to each other, offsetting each other. Their radial forces are in the same direction, pointing to the circle center along the radial direction, forming a resultant force to move the friction monomer 10 to the central space 22.

Figure 3:
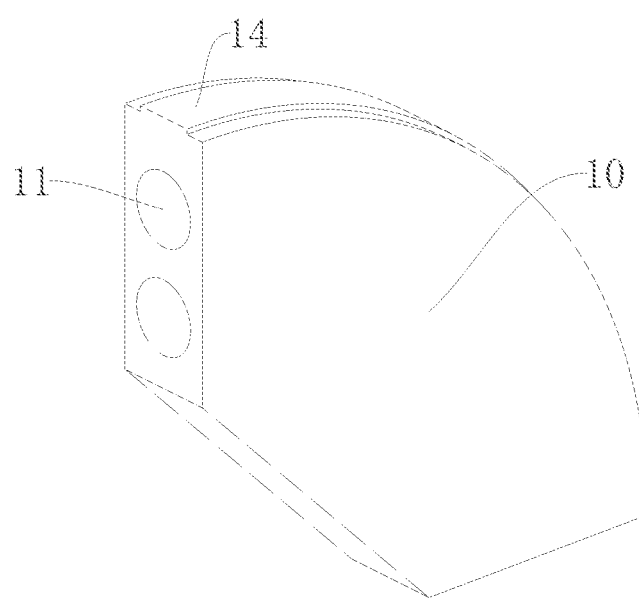
FIG. 3 is a schematic three-dimensional structural diagram of the friction monomer adopted by one embodiment of the present application.

In some embodiments, an improved embodiment of mounting of the elastic component 20 may adopt the structure shown in FIG. 2 and FIG. 3. Refer to FIG. 2 and FIG. 3, the corresponding surface of the friction monomer 10 is provided with a first accommodating groove 11. The corresponding surface is the side of one friction monomer 10 adjacent to the other friction monomer 10, and each friction monomer 10 has two corresponding surfaces. Both ends of each first tension spring 21 are respectively fixedly connected to the two adjacent friction monomers 10, specifically, they are respectively fixed to the groove bottoms of the two first accommodating grooves ii whose openings are opposite.

If the first accommodating groove 11 is not set, the first tension spring 21 is between two adjacent friction monomers 10. Even the speed does not exceed the preset value, there is a certain gap between the adjacent friction monomers 10 due to the first tension spring 21. Which is not conducive to the overall stability of friction disk 130. Moreover, in this case, the length of the first tension spring 21 is also greatly limited and may not be too long. With the first accommodating groove 11 set, the first tension spring 21 is in the first accommodating groove 11 when the speed does not exceed the preset value. The adjacent friction monomers 10 may be close to each other through the side, which is conducive to improving the overall stability of the friction disk 130. Moreover, the first tension spring 21 may also choose a longer specification to optimize the effect of applying tension to the friction monomer 10.

In some embodiments, an improved embodiment of the friction monomer 10 may adopt the structure shown in FIG. 1-FIG. 4. Refer to FIG. 1-FIG. 4, the section of the central space 22 is polygonal. When the central space 22 (i.e. the shaft sleeve fitting space, a space for adapting a shaft sleeve) surrounded by the friction monomer 10 is polygonal, the shape of the shaft sleeve 30 may easily fit the central space 22.

When the rotational speed is low, the inner wall of the central space 22 fits with the peripheral side wall of the shaft sleeve 30 (That is, the inner surface of each friction monomer 10 fits with the outer peripheral wall of the shaft sleeve 30). While when the rotational speed is too high, the adjacent friction monomers 10 are separated, so that the central space 22 becomes larger and larger than the outer diameter of the shaft sleeve 30. At this time, the friction monomer 10 is separated from the drive of the shaft sleeve 30, and the rotational speed of the friction disk 130 will be correspondingly reduced compared with the shaft sleeve 30. That is, the shaft sleeve 30 rotates faster, while the speed of the friction disk 130 is slower, and there is a speed difference between the shaft sleeve 30 and the friction disk 130. The speed difference will continue to increase until each edge of the shaft sleeve 30 is correspondingly clamped on each surface of the central space 22 (from a two-dimensional perspective, that is, each vertex of the shaft sleeve 30 is clamped on each edge of the section polygon of the central space 22), and the shaft sleeve 30 is stably clamped with the friction monomer 10 again. At this time, the shaft sleeve 30 can transmit the driving force to the friction monomer 10, so that the friction disk 130 maintains a certain speed, and the friction monomer 10 maintains a state of separation from each other. In this state, the outer arc surface of the friction monomer 10 contacts the inner wall of the magnetic yoke iron core 110, resulting in friction and braking. In some special cases, the shaft sleeve 30 may be clamped with each friction monomer 10 after the speed is reduced, so that the friction monomer 10 cannot be pulled back by the first tension spring 21. At this time, in order to restore the friction monomer 10 to the normal state, the shaft sleeve 30 can be rotated reversely so that the shaft sleeve 30 is no longer clamped with the friction monomer 10, and the friction monomer 10 can be pulled back by the first tension spring 21.

The structure provided in this embodiment can ensure that when the friction disk 130 runs at a high speed and the normal braking function fails, it can provide additional braking force and enhance the reliability of the brake.

For example, one side of the friction monomer 10 close to the central space 22 is a plane, and the side is the surface on which the friction monomer 10 fits with the peripheral side wall of the shaft sleeve 30. The number of friction monomers 10 is greater than or equal to 3, and the number of the friction monomers 10 is equal to the number of sides of the section polygon of the central space 22. For example, when the number of friction monomers 10 is four, the section of the central space 22 is quadrilateral.

It should be noted that the section of the central space 22 may be circular in other embodiments. When the section of the central space 22 is circular, the shaft sleeve 30 and the friction disk 130 may be matched and connected through a toothed structure. The shaft sleeve 30 and the friction disk 130 connected by the toothed structure may have a stable matching state, and there is no need to reverse the shaft sleeve 30 when the shaft sleeve 30 is clamped with the friction disk 130 and when the central space 22 is polygonal.

Figure 5:
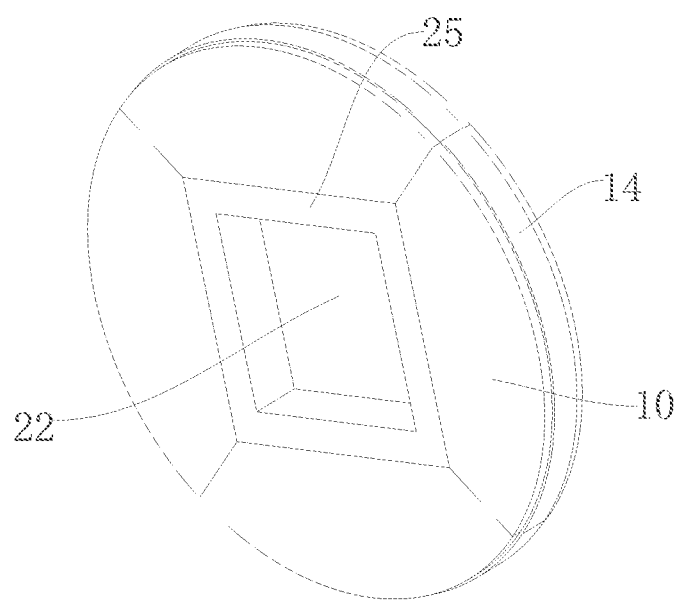
FIG. 5 is a schematic three-dimensional structural diagram of the friction disk provided by one embodiment of the present application.
Figure 6:
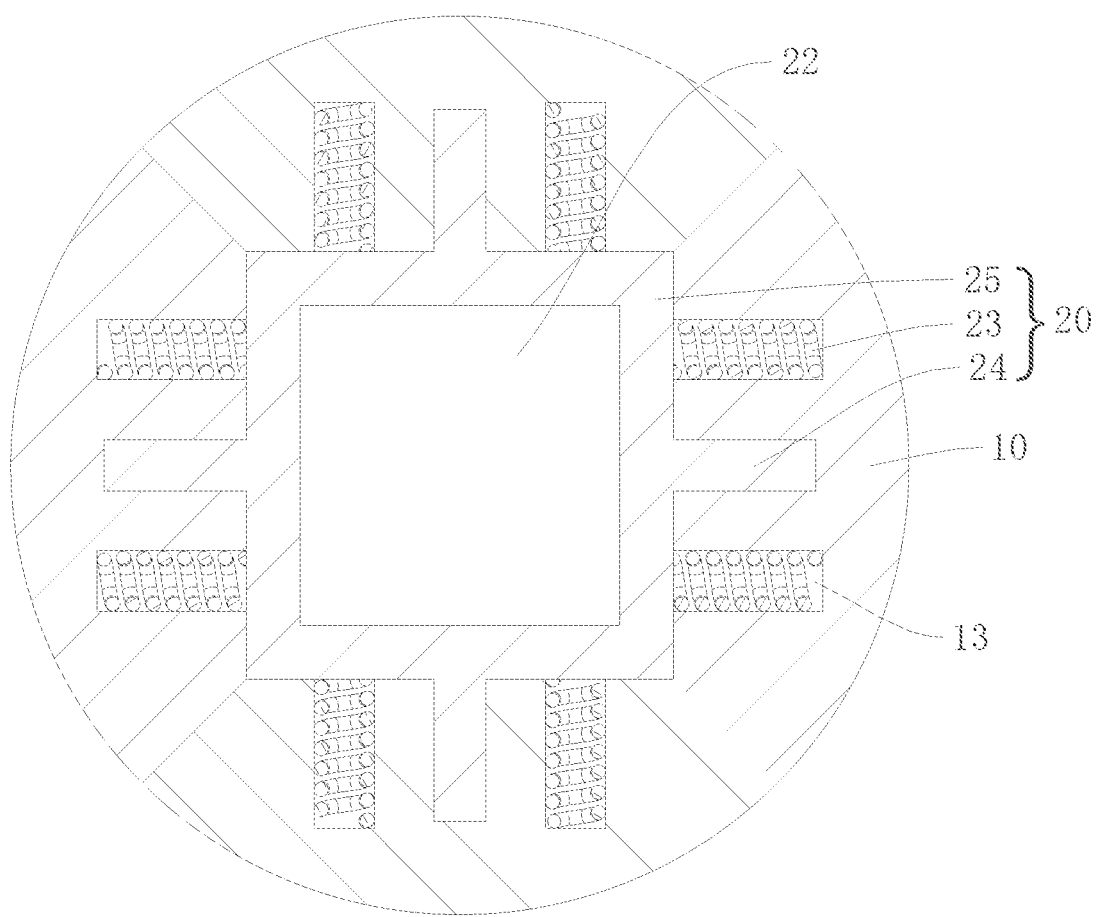
FIG. 6 is a schematic sectional structural diagram of the friction disk provided by one embodiment of the present application.

In some embodiments, an alternative embodiment of the elastic component 20 may adopt the structure shown in FIG. 5, FIG. 6 and FIG. 8. In the above embodiment, the first tension spring group is used to connect each friction monomer 10 as a whole to form a friction disk 130. In this embodiment, the fixed frame 25 and the second tension spring group are used to connect each friction monomer 10 as a whole of the friction disk 130. Refer to FIG. 5, FIG. 6 and FIG. 8, the elastic component 20 includes a fixed frame 25 and a second tension spring group. The fixed frame 25 is located in the central space 22 and the inside of the fixed frame 25 forms a space for adapting the shaft sleeve. The second tension spring group is connected between the plurality of friction monomers 10 and the fixed frame 25 (i.e. one end of the second tension spring group is connected with the friction monomer 10, and the other end is connected with the fixed frame 25). The second tension spring group includes at least one second tension spring 23. The fixed frame 25 fits with the shaft sleeve 30. When the rotational speed is lower than the preset value, the tensile force of the second tension spring 23 is greater than the centrifugal force received by each friction monomer 10, and one side of the friction monomer 10 close to the central space 22 is attached to the peripheral surface of the fixed frame 25. When the rotational speed is higher than the preset value, the tensile force of the second tension spring 23 is less than the centrifugal force received by each friction monomer 10 and the friction monomer 10 moves away from the central space 22 along the radial direction of the annular array, and one side of the friction monomer 10 close to the central space 22 is separated from the outer peripheral surface of the fixed frame 25. In this way, with the change of the speed of the braked shaft, the friction monomer 10 dynamically approaches or moves away from the central space 22 along the radial direction of the friction disk 130. Moreover, when the friction monomer 10 moves away from the central space 22 along the radial direction of the friction disk 130, the outer diameter of the whole friction disk 130 becomes larger, and the outer circumference of the friction disk 130 contacts the inner wall of the magnetic yoke iron core 110 to generate friction and braking, so as to reduce the speed of the friction disk 130 and the braked shaft.

It should be noted that the fixed frame 25 may also be called an attachment frame. The friction monomer 10 is connected and attached to the attachment frame through the second tension spring 23 to form a friction disk 130.

In this embodiment, the section of the fixed frame 25 may be circular or polygonal. When the section of the fixed frame 25 is circular, the number of the second tension spring group is one, the second tension spring group includes a plurality of the second tension springs 23, the plurality of the second tension springs 23 are evenly distributed around the fixed frame 25. When the section of the fixed frame 25 is polygonal, the number of the second tension spring group is a plurality, a plurality of the second tension spring groups are set one by one corresponding to one side of the fixed frame 25 away from the central space 22. The number of sections of the fixed frame 25 is the same as the number of sides. Moreover, each second tension spring group is located in the middle of the outer side corresponding to the fixed frame 25.

Figure 7:
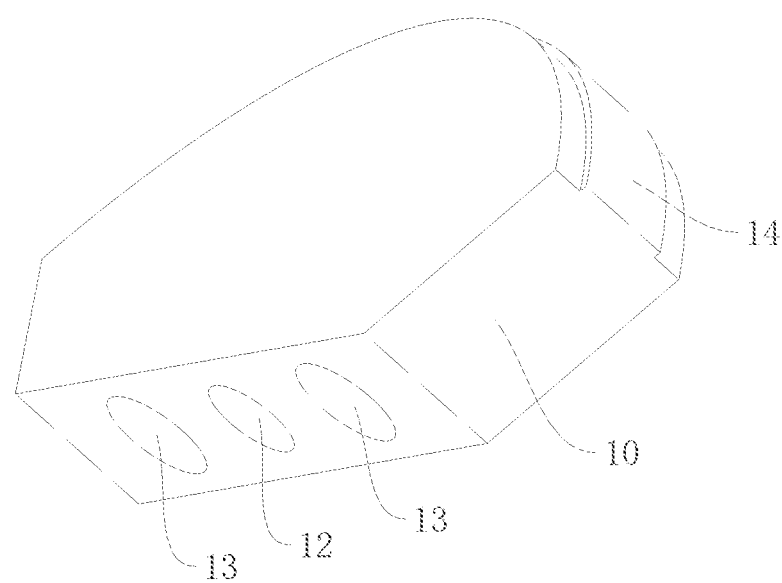
FIG. 7 is a schematic three-dimensional structural diagram of the friction monomer adopted by one embodiment of the present application.

In some embodiments, an improved embodiment of the elastic component 20 may adopt the structure shown in FIG. 6-FIG. 8. Refer to FIG. 6-FIG. 8, the elastic component 20 further includes at least one guide element 24 having an end fixedly connected to the fixed frame 25. Each guide element 24 extends along the radial direction of the annular array, and a chute 12 slidably matched with the guide element 24 is arranged on one side of the friction monomer 10 close to the central space 22. The guide element 24 and the chute 12 correspond one by one. The guide element 24 may guide the movement of the friction monomer 10 to ensure that the friction monomer 10 moves according to the preset path and prevent the movement path of the friction monomer 10 from skewing. This enhances the ability of the friction monomer 10 to withstand interference and ensures that the friction monomer 10 accurately corresponds to the peripheral surface of the fixed frame 25 when it is closed and reset.

For example, the guide element 24 may be a pin sliding with the chute 12. The guide element 24 may also be a guide rod, which is linear and has unlimited section shape. For example, the section shape of the guide rod may be circular or square. The matching form of the guide element 24 and the chute 12 provided in this embodiment has better effect when the section of the fixed frame 25 is polygonal.

In some embodiments, an improved embodiment of the guide element 24 may adopt the structure shown in FIG. 6-FIG. 8. Refer to FIG. 6-FIG. 8, each guide element 24 is arranged in the middle position of one side of the friction monomer 10 close to the central space 22. The guide element 24 is in the middle position, which is conducive to the stability of the friction monomer 10 when moving along the radial direction of the annular array and optimizes the guiding effect.

In this embodiment, when the second tension spring group includes a plurality of second tension springs 23, the plurality of second tension springs 23 are equidistantly distributed along the long side of the side of the friction monomer 10. When the number of the second tension springs 23 is even, the number of the second tension springs 23 on both sides of the guide element 24 is the same. When the number of the second tension springs 23 is odd, the difference in the number of the second tension springs 23 on both sides of the guide element 24 is 1; alternatively, the number of the second tension springs 23 on both sides of the guide element 24 is the same, and the second tension spring 23 in the middle is sleeved on the guide element 24. At this time, the second tension spring 23 sleeved on the guide element 24 is located in the chute 12 and shares the chute 12 with the guide element 24.

In some embodiments, an improved embodiment of the installation of the second tension spring 23 may adopt the structure shown in FIG. 6 and FIG. 7. Refer to FIG. 6 and FIG. 7, a second accommodating groove 13 is formed on one side of the friction monomer 10 close to the central space 22. Both ends of the second tension spring 23 are respectively fixedly connected to the groove bottom of the second accommodating groove 13 and the outer peripheral surface of the fixed frame 25. When the rotational speed does not exceed the preset value, the tension of the second tension spring 23 is greater than the centrifugal force of the friction monomer 10, and the friction monomer 10 is close to the fixed frame 25. If without the second accommodating groove 13, the second tension spring 23 is between the friction monomer 10 and the fixed frame 25, and there will be a gap between the friction monomer 10 and the fixed frame 25, and the length of the second tension spring 23 may not be too long. With the second accommodating groove 13 set, the second tension spring 23 is in the second accommodating groove 13 when the speed does not exceed the preset value, which enables the friction monomer 10 to cling to the fixed frame 25 and improves the overall stability of the friction disk 130. Moreover, the second tension spring 23 may also choose a longer specification to optimize the effect of reciprocating movement of the friction monomer 10.

In some embodiments, an improved embodiment of the friction monomer 10 may adopt the structure shown in FIG. 1-FIG. 8. Refer to FIG. 1-FIG. 8, a boss 14 is arranged on one side of each the friction monomer 10 away from the central space 22. The requirements for the thickness of the friction disk 130 and the flatness of the two surfaces are very high. If the boss 14 is not set, when overspeed braking occurs (that is, when the rotational speed exceeds the preset value, the friction monomer 10 is far away from the central space 22, and the outer peripheral surface of the friction disk 130 rubs with the inner wall of the magnetic yoke iron core 110), the outer edge of the friction disk 130 will be worn, which may affect the flatness of the two side surfaces of the friction disk 130, the radius and the thickness of the outer ring of the friction disk 130, and then affect the braking effect. When the friction monomer 10 moves away from the central space 22, the boss 14 on the outer circumference of the friction monomer 10 first contacts the inner wall of the magnetic yoke iron core 110 due to the boss 14 provided. In this way, the boss 14 is preferentially worn, and the flatness of the surface on both sides of the friction disk 130, the radius and the thickness of the outer ring of the friction disk 130 are not affected, so as to maintain a good braking effect.

Based on the same inventive concept, the application also provides a brake with the friction disk 130.

With reference to FIG. 9-FIG. 18, the brake provided by embodiments of this application is now described. The brake includes a magnetic yoke iron core 110, a first movable plate 120, friction disk 130, a first coil 140, at least one second coil 141, an armature 150 and an elastic part 160 (the number of the elastic part 60 may be one or more). The magnetic yoke iron core 110 distributes a first mounting space in and a second mounting space 112 sequentially and concentrically from inside to outside of the magnetic yoke iron core 110; the first mounting space 111 penetrates through a center position of the magnetic yoke iron core 110 in an axial direction of the magnetic yoke iron core 110, and an opening of the second mounting space 112 faces a second shaft end of the magnetic yoke iron core 110; the magnetic yoke iron core also distributes at least one third mounting space 119 coaxially arranged with the second mounting space 112, and an opening of each one of the at least one third mounting space 119 faces the second shaft end of the magnetic yoke iron core 110. The first movable plate 120 is located in the first mounting space in and close to a first shaft end of the magnetic yoke iron core 110; the first shaft end is an opposite end of the second shaft end. The friction disk 130 is arranged in the first mounting space in and located at the side of the first movable plate 120 close to the second shaft end. The first coil 140 is arranged in the second mounting space 112. The at least one second coil 141 is correspondingly arranged in the at least one third mounting space 119. The armature 150 is located at the second shaft end of the magnetic yoke iron core 110; the armature 150 is connected with the first movable plate 120 through at least one connector 180; the at least one connector 180 passes through the magnetic yoke iron core 110 and is slidably matched with the magnetic yoke iron core 110; and the armature 150 is configured to drive the first movable plate 120 to move along the axial direction of the magnetic yoke iron core 110. The elastic part 160 is arranged between the armature 150 and the magnetic yoke iron core 110, and the elastic part 60 has a pre-tightening force that enables the armature 150 to be far away from the magnetic yoke iron core 110. The second mounting space 112 and the at least one third mounting space 119 are respectively provided with a wiring opening 118 in communication with outside; an outgoing line of the first coil 140 extends out through the wiring opening 118 of the second mounting space 112; and an outgoing line of each one of the at least one second coil 141 extends out through the wiring opening 118 of each one of the at least one third mounting space 119.

It should be noted that the third mounting space 119 is coaxial with the second mounting space 112. The third mounting space 119 may be located between the first mounting space in and the second mounting space 112, in the outer ring area of the second mounting space 112, or in the inner ring area of the first mounting space 111. In this embodiment, the wiring opening 118 of the second mounting space 112 and the third mounting space 119 are not necessary. The first coil 140 and the second coil 141 may be connected to the outside through the wiring opening 118, or may be connected to the outside through the openings of the second mounting space 112 and the third mounting space 119.

It should be noted that the axial direction of the magnetic yoke iron core 110 is the thickness direction of the magnetic yoke iron core 110. After the magnetic yoke iron core 110 forms the brake, the axis of the braked shaft penetrates through the center of the magnetic yoke iron core 110 along the thickness direction of the magnetic yoke iron core 110. That is, the center line which penetrates through the magnetic yoke iron core 110 along the thickness direction coincides with the axis of the braked shaft. The first shaft end is the first side of the magnetic yoke iron core 110, and the second shaft end is the second side of the magnetic yoke iron core no. The first side and the second side are different sides of the magnetic yoke iron core 110 distributed along its own thickness direction. The second mounting space 112 may also be referred to as a second mounting groove. The third mounting space 119 may also be referred to as a third mounting groove. The magnetic yoke iron core 110 may also be referred to as a yoke, a housing, a magnetic conducting housing, a conducting magnet, a shell, or the like. The magnetic yoke iron core 110 and the armature 150 themselves are not magnetic. Those skilled in the art can understand that when one or both of the first coil 140 and the second coil 141 are energized, both the magnetic yoke iron core 110 and the armature 150 are magnetized to produce magnetism, and they attract each other. While when the first coil 140 and the second coil 141 are not energized, the magnetism of the magnetic yoke iron core 110 and the armature 150 disappears.

It should be noted that based on the friction disk 130 provided in the previous embodiment, when the speed of the friction disk 130 exceeds the preset value, the friction monomer 10 moves outward, and the outer arc surface of the friction monomer 10 will contact and rub with the inner ring of the magnetic yoke iron core 110. The inner ring of the magnetic yoke iron core 110 refers to the inner side wall of the magnetic yoke iron core 110 formed when the magnetic yoke iron core 110 is penetrated by the first mounting space in. The first mounting space 111 is usually cylindrical, and accordingly, the inner ring of the magnetic yoke iron core 110 is usually cylindrical.

The working principle of the brake provided in this embodiment is as follows. When the brake is in use, the first coil 140 and the second coil 141 are connected to the external power supply. When energizing the first coil 140 and the second coil 141, the magnetic yoke iron core 110 and the armature 150 generate magnetic force attracting each other under the excitation of the first coil 140 and the second coil 141. The magnetic force attracts the armature 150, and the armature 150 moves close to the first shaft end, compresses the elastic part 160, and drives the first movable plate 120 to move away from the second shaft end. During the movement of the first movable plate 120 away from the second shaft end, the first movable plate 120 separates from the friction disk 130 and releases the friction disk 130. The friction disk 130 is no longer pressed, and the friction disk 130 is no longer pressed against the structure of clamping the friction disk 130 with the first movable plate 120 (extending portion 113), and the rotation of the friction disk 130 is released. At this time, the friction disk 130 is matched with the braked shaft or shaft sleeve 30 and rotates normally. When the power is cut off, the magnetic force on the magnetic yoke iron core 110 and the armature 150 disappears, and the elastic part 160 releases to push the armature 150. The armature 150 moves away from the first shaft end. When the armature 150 moves, it drives the first movable plate 120 close to the second shaft end of the magnetic yoke iron core 110, causing the first movable plate 120 to squeeze with friction disk 130. The friction disk 130 also rubs with the structure of clamping the friction disk 130 with the first movable plate 120 (extending portion 113). Under the action of friction, the rotating speed of friction disk 130 gradually decreases until it drops to zero, completing the braking process.

Compared with the traditional brake, the brake provided by this embodiment has at least the following two major improvements.

Figure 20:
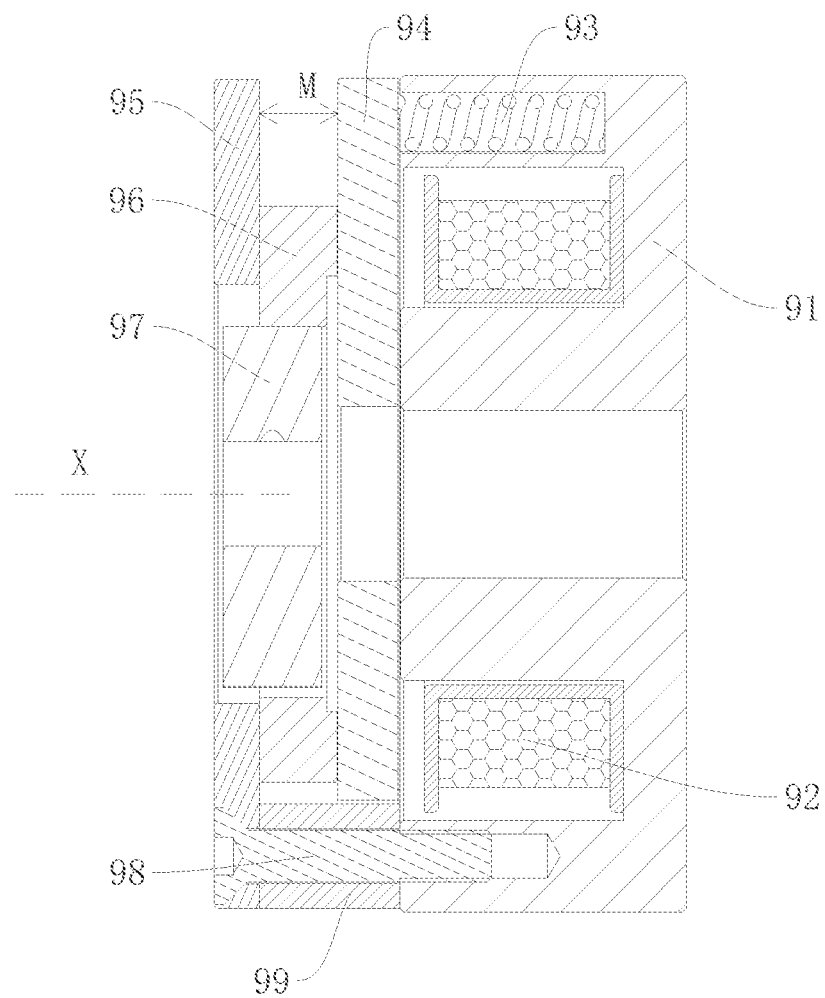
FIG. 20 is a schematic structural diagram of the stacked brake in the prior art.

A major improvement in the first aspect is the arrangement of the friction disk 130. In the traditional brake, as shown in FIG. 20, the friction disk 96 and the magnetic yoke 91 are stacked in the axial direction, and the friction disk 96 is located outside the magnetic yoke 91. In the brake provided by this embodiment, the friction disk 130 is located inside the magnetic yoke iron core 110, so the friction disk 130 does not increase the overall thickness of the brake.

A major improvement in the second aspect is the manner in which the friction disk 130 is clamped. In the traditional brake, as shown in FIG. 20, when braking, the friction disk 96 is clamped by the armature 94 and the tail plate 95. In the brake provided by this embodiment, the friction disk 30 is clamped by the first movable plate 20 and a structure that can cooperate with the first movable plate 120 to clamp the friction disk 130. This structure, like the first movable plate 120 and the friction dish 30, is also located inside the magnetic yoke iron core no, and does not increase the overall thickness of the brake. The first movable plate 120 is connected with the armature 150 and moves axially driven by the armature 150 to clamp or loosen the friction disk 130. It should be noted that the above-mentioned clamping manner in which the friction disk 130 is clamped can ensure that the brake provided in this embodiment is a power-off braking, that is, when the first coil 140 and the second coil 141 are powered off, the brake is in a braking state. Compared with power-on braking, those skilled in the art can understand that power-off braking is a safer way.

Compared with the traditional brake, the brake provided by this embodiment has many advantages.

Firstly, in the brake provided by this embodiment, the first movable plate 120, the friction disk 130, the first coil 140 and the second coil 141 are all inside the magnetic yoke iron core 110. The thickness of individual parts such as the first movable plate 120, the friction disk 130, the first coil 140 and the second coil 141 will not increase the overall thickness of the brake, which greatly reduces the overall thickness of the brake. For example, the thickness of an existing brake is 14 mm. If the existing brake is modified according to the structure provided in this embodiment, the thickness of the existing brake can be easily reduced to 7 mm, and the thickness reduction effect is obvious. Regardless of the small air gap between the magnetic yoke iron core 110 and the armature iso, the overall thickness of the brake provided by this embodiment only depends on the sum of the thicknesses of the magnetic yoke iron core 110 and the armature 150.

Secondly, the thickness of the magnetic yoke iron core 110 does not have to be excessively reduced, so the space for accommodating the first coil 140 and the second coil 141 can be guaranteed. The volume of the coil 140 and the second coil 141 do not have to be excessively compressed, which avoids the problems of weakening the magnetic field and increasing the heating power.

Thirdly, the thickness of the first movable plate 120 and the friction disk 130 as friction pair parts does not increase the overall thickness of the brake. Therefore, the thickness of the first movable plate 120 and the friction disk 130 can be guaranteed. The thickness of the first movable plate 120 and the friction disk 130 need not be excessively reduced, which produces at least the following four advantages. Firstly, the rigidity of the parts is guaranteed, and the probability of creep and stress deformation of the parts is greatly reduced. Secondly, the materials of parts will not be reduced, and the heat capacity of parts can be guaranteed.

During the friction process, the parts will not rise too fast, which greatly reduces the probability of adverse conditions such as braking force attenuation and thermal stress deformation. Thirdly, the thickness of the parts will not be too thin, and the parts will not amplify the noise or make the noise more sharp during friction. In fact, the brake provided in this embodiment has low noise, and is especially suitable for occasions with high speed and high requirements for silence. The friction disk 130 and the first movable plate 20 are located in the first mounting space 111. When the brake works, the friction disk 130 and the first movable plate 120 are surrounded by the magnetic yoke iron core 110 and the surrounding parts. In addition to the small friction noise itself, the outward propagation path of friction noise is also closed, which further reduces noise. Fourthly, the thickness of friction disk 130 can be appropriately increased, which can not only improve the overall structural strength of the friction disk 130 and facilitate processing, but also easily ensure the perpendicularity of the middle hole and the friction surface, and increase the matching length between the friction disk 130 and the shaft sleeve 30 or the braked shaft, so as to reduce the shake, noise and drag torque during rotation.

Fourthly, compared with the friction disk of the traditional brake, the friction disk 130 in this embodiment has smaller radius and greater thickness, lower manufacturing difficulty and cost, and good stability during operation. At the same speed, the friction disk with smaller radius has lower linear friction speed, less wear and long service life. The friction disk with smaller radius has smaller linear speed of its outer ring and small moment of inertia, which can reduce the throwing out of dust. Since the friction disk 130 is located inside the magnetic yoke iron core 110, the thrown dust is also left inside the magnetic yoke iron core 110, which is conducive to the cleanliness of the working environment of the brake. In particular, the dust is left inside the magnetic yoke iron core 110, which can prevent the dust from entering the air gap between the magnetic yoke iron core 110 and the armature 150. If entering the air gap, the dust will affect the axial movement of armature 150, thereby affecting the normal operation of the brake.

Fifthly, compared with the traditional brake, in the brake provided by this embodiment, the armature 150 does not contact and rub with the friction disk 130, which produces at least two advantages. Firstly, the accuracy requirements of the armature 150 are reduced, thereby reducing the manufacturing cost of the armature 150. Secondly, the armature 150 will not produce high temperature and deformation due to friction, and its magnetic properties are stable. The armature in the traditional brake would produce high temperature and deformation due to friction, which would affect the magnetic properties and deteriorate the magnetic properties. In the brake provided by this embodiment, instead of the armature and tail plate, the parts that rub with the friction disk 130 are the first movable plate 120 and the structure that can clamp the friction disk 130 in cooperation with the first movable plate 120. The structure and the first movable plate 120 need not to be made of soft magnetic materials, and the materials can be selected in a wider range during design, with low design difficulty and cost. Moreover, the first movable plate 120 does not need to be used as a magnetic circuit to generate a magnetic field. Therefore, high temperature and a small amount of deformation do not affect the normal operation of the first movable plate 120, which improves the reliability of the brake. In addition, the first movable plate 120 and the friction disk 130 have the small radius and appropriate thickness. Therefore, the first movable plate 120 has the same advantages as the friction disk 130 in the above fourth aspect.

Sixthly, the simultaneous setting of the first coil 140 and the second coil 141 can increase the torque. Compared with a single coil, it can achieve high torque under the same outer diameter size and power conditions, and it also does not increase the overall thickness. It has great advantages over the traditional stacked structure.

In some embodiments, a specific embodiment of the installation of the first coil 140 and the second coil 141 may adopt the structure shown in FIG. 10-FIG. 17. Refer to FIG. 10-FIG. 17, the first coil 140 and the at least one second coil 141 are connected in series, and an on state and an off state are controlled by a same control switch; alternatively, the first coil 140 and the at least one second coil 141 are connected in parallel, and the on state and the off state are controlled by different control switches. When the first coil 140 and the second coil 141 are connected in series, a control switch that can adjust the voltage needs to be installed because the brake needs to absorb the large voltage and maintain the small voltage during operation. When the first coil 140 and the at least one second coil 141 are connected in parallel and controlled by different control switches, in order to achieve the above effect of large voltage adsorption and small voltage maintenance, the first coil 140 and the at least one second coil 141 can be energized at the same time when adsorption is required. When it is necessary to maintain, one of the control switches controls the first coil 140 or the second coil 141 to be closed separately, thereby eliminating the need for a control switch to adjust the voltage, thereby reducing the manufacturing cost.

In some embodiments, an improved embodiment of the friction disk 130 may adopt the structure shown in FIG. 14-FIG. 17. Refer to FIG. 14-FIG. 17, there are a plurality of friction disks 130, which are successively arranged in the first mounting space 111 along the axial direction of the magnetic yoke iron core 110, and are located on the side of the first movable plate 120 close to the second shaft end. A second movable plate 122 is arranged between the adjacent friction disks 130, and the second movable plate 122 is connected with the connector 180. Torque increase can be achieved by using a plurality of friction disks 130. Compared with using a single friction disk 130, using multiple friction discs 130 can increase the torque under the same outer diameter size and power conditions, and also does not increase the overall thickness of the brake. It has great advantages over the traditional stacked structure.

In some embodiments, a specific embodiment of the connector 180 may adopt the structure shown in FIG. 10-FIG. 17. Refer to FIG. 10-FIG. 17, each the connector 180 includes a guide pole 182 and two connecting parts 181. The guide pole 182 is penetrated into the magnetic yoke iron core 110, and one end of the guide pole 182 is connected to the first movable plate 120 through one of the two connecting parts 181; the other end of the guide pole 182 is connected to the armature 150 through the other one of the two connecting parts 181. The at least one second movable plate 122 is slidably connected with the guide pole 182. The guide pole 182 slides and fits with the magnetic yoke iron core 110. When the armature 150 drives the first movable plate 120 to move back and forth along the axial direction of the magnetic yoke iron core 110, the action is stable and smooth. The second movable plate 122 is slidably connected to the guide pole 182. When the first movable plate 120 is close to the magnetic yoke iron core 110 and squeezes the friction disk 130, it can also squeeze the second movable plate 122 so that the second movable plate 122 is clamped by the two friction disks 130 to generate braking force.

Generally, the axis of the guide pole 182 is parallel to the axis of the magnetic yoke iron core 110. The guide pole 182 is fixedly connected with the first movable plate 120 and the armature 150 through the two connecting parts 181 respectively. There are no restrictions on the implementation of the connecting part 181, such as bolts, screws, pins, rivets, etc. Whether the two connecting parts 181 are implemented in the same way is not limited; that is, the two connecting parts 181 may adopt the same implementation method or different implementation methods.

The guide pole 182 may also be fixedly connected with the first movable plate 120 and the armature 150 by welding or integral molding. For example, when the integral molding method is adopted, the guide pole 182 may be integrated with the first movable plate 120; that is, one end of the guide pole 182 is fixedly connected with the first movable plate 120 by integral molding, and the other end of the guide pole 182 is fixedly connected with the armature 150 by other methods except integral molding.

In conclusion, the present application is not limited to the fixed connection mode between the guide pole 182 and the first movable plate 120 or between the guide pole 182 and the armature 150. All known fixed connection modes without creative work are within the protection scope of this application.

In some embodiments, a specific embodiment of the first movable plate 120 may adopt the structure shown in FIG. 13-FIG. 17. Refer to FIG. 13-FIG. 17, the end surface of the first shaft end of the magnetic yoke iron core 110 is formed with a positioning slot 117, and the positioning slot 117 is connected with the first mounting space 111, and the connector 180 passes through the positioning slot 117. The outer circumference of the first movable plate 120 is provided with a locating block 121 (or radial extension part) corresponding to the positioning slot 117 (or avoidance slot). The positioning slot 117 is used to avoid the locating block 121 in the spatial relationship, and the connector 180 is connected with the locating block 121. When the first movable plate 120 is installed, the locating block 121 of the first movable plate 120 is located in the positioning slot 117, which can play a role of limiting effect and facilitate installation.

The limiting effect means that the cooperation between the locating block 121 and the positioning slot 117 has a limiting effect. When installing the movable plate, the operator does not need to spend attention, experience and professional knowledge, and can directly complete the correct operation without error, so as to facilitate the installation of the movable plate.

Figure 17:
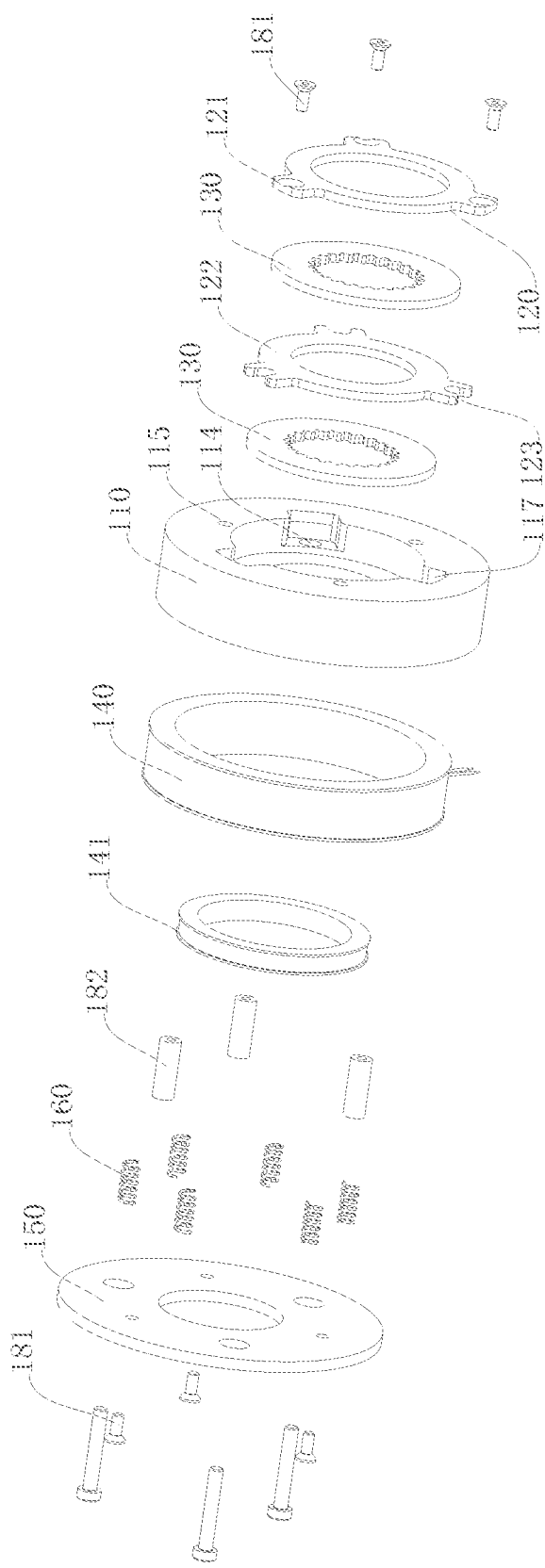
FIG. 17 is a schematic explosive structural diagram 2 of the brake provided by one embodiment of the present application.

As shown in FIG. 17, when the brake has two movable plates, namely, the first movable plate 120 and the second movable plate 122, the second movable plate 122 is also provided with a locating block 121. The locating block 121 on the second movable plate 122 corresponds to the locating block 121 on the first movable plate 120. The second movable plate 122 also has a fool proof effect when installed. The locating block 121 on the second movable plate 122 is recessed towards the axis of the magnetic yoke iron core 110 to form a clamping slot 123, which slides and fits with the guide pole 182. When the second movable plate 122 moves in the axial direction (the thickness direction of the brake), the guide pole 182 guides the second movable plate 122. This is the case where the locating block 121 on the first movable plate 120 and the second movable plate 122 share the positioning slot 117.

Figure 19:
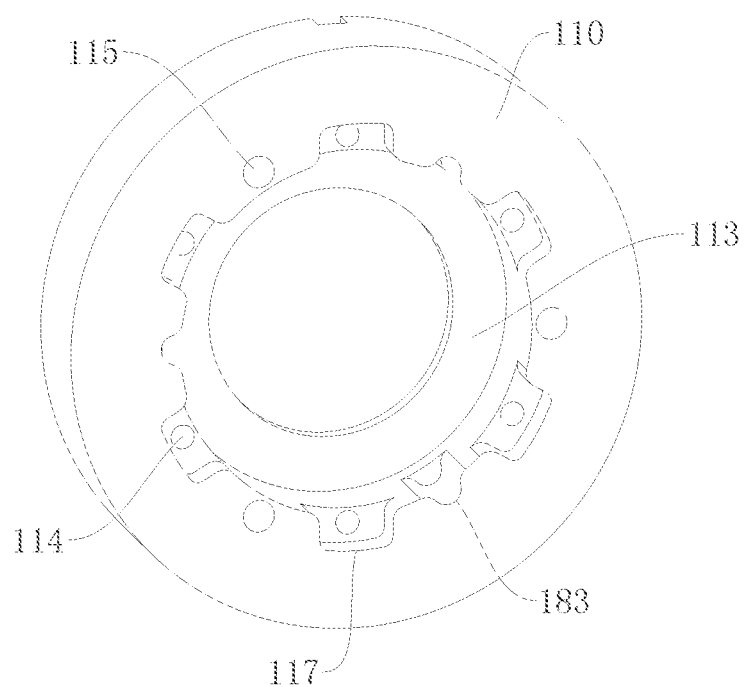
FIG. 19 is a schematic three-dimensional structural diagram of the magnetic iron core adopted by one embodiment of the present application.

The locating block 121 on the first movable plate 120 and the second movable plate 122 may not share the positioning slot 117. As shown in FIG. 19, the magnetic yoke iron core 110 is provided with not only a positioning slot 117, but also a guide slot 183. The positioning slot 117 and the guide slot 183 are mutually staggered in the circumferential direction. Accordingly, the locating block 121 of the first movable plate 120 and the second movable plate 122 are also staggered from each other in the circumferential direction. The locating block 121 of the first movable plate 120 is located in the positioning slot 117, and the locating block 121 of the second movable plate 122 is located in the guide slot 183. The first movable plate 120 is connected with the guide pole 182 through the locating block 121, and the guide pole 182 slides in the connecting hole 114 to guide the axial movement of the first movable plate 120. The second movable plate 122 is slidably connected with the guide slot 183 through the locating block 121 to realize the guidance of axial movement. At this time, the locating block 121 on the second movable plate 122 does not need to be provided with a clamping slot 123. In this case, the depth of the positioning slot 117 and the guide slot 183 are generally different. Generally, since the depth of the second movable plate 122 is greater than that of the first movable plate 120, the depth of the guide slot 183 is also greater than that of the positioning slot 117.

It should be noted that when the locating blocks 121 on two movable plates share the positioning slot 117, the depth of the positioning slot 117 needs to be greater than the sum of the thickness of all the locating blocks 121 located in the positioning slot 117, so as to ensure that all movable plates have freedom to move along the thickness direction of the brake. When the brake has only one movable plate, that is, only the first movable plate 120, the depth of the positioning slot 117 is greater than the thickness of the locating block 121 of the first movable plate 120. When the brake has two movable plates at the same time, that is, the first movable plate 120 and the second movable plate 122 at the same time, the depth of the positioning slot 117 is greater than the sum of the thickness of the two locating blocks 121. One of the connecting parts 181 of the connector 180 is connected with the armature 150, and the other connecting part 181 is connected with the locating block 121 of the first movable plate 120. The first movable plate 120 can move along the axial direction of the magnetic yoke iron core 110 (that is, the thickness direction of the magnetic yoke iron core 110 and the thickness direction of the brake) driven by the armature 150, and the second movable plate 122 can also move along the axial direction of the magnetic yoke iron core 110 when the second movable plate 122 is installed.

The depth of the positioning slot 117 is determined by factors such as the thickness of the locating block 121 and the axial moving distance of the movable plate. For example, when the brake has only the first movable plate 120, the axial moving distance of the first movable plate 120=the length of the guide pole 182−the thickness of the friction disk 130−the thickness of the locating block 121−the thickness of the extending portion 113. The depth of the positioning slot 117 is≥the axial moving distance of the first movable plate 120+the thickness of the first movable plate 120.

The same is true when the brake has two or more movable plates. When all movable plates share the positioning slot 117, the depth of the positioning slot 117 cannot be less than the sum of the axial moving distance and thickness of all movable plates. When each movable plate does not share the positioning slot 117, for example, as shown in FIG. 19, the depth of the positioning slot (or guide slot) is determined according to the depth of its corresponding movable plate. The greater the depth of the movable plate, that is, the closer it is to the extending portion 113, the greater the depth of the positioning slot (or guide slot) corresponding to the movable plate.

The depth of the positioning slot 117 discussed above is provided that all the movable plates are always located in the first mounting space 111, that is, even if all the movable plates moves axially, it will not protrude from the surface of the magnetic yoke iron core 110. It should be noted that in some cases, the installation space of the brake is relatively loose, and the movable plate can protrude from the surface of the magnetic yoke iron core 110, that is, even if the movable plate protrudes from the surface of the magnetic yoke iron core 110, it will not interfere with other parts. At this time, the depth of the positioning slot 117 can be appropriately reduced or even zero, that is, the positioning slot 117 is not set. It is essentially the guide pole 182 that guides the axial movement of the first movable plate 120, so even if the positioning slot 117 is not set, the axial movement of the first movable plate 120 will not be affected.

In some embodiments, an improved embodiment of the positioning slot 117 may adopt the structure shown in FIG. 13-FIG. 17. Refer to FIG. 13-FIG. 17, there may be a plurality of positioning slots 117, that is, the number of the positioning slots 117 may be three or more. The plurality of positioning slots 117 are evenly distributed around the axis of the magnetic yoke iron core 110 (i.e. the center line passing through the magnetic yoke iron core 110 along the thickness direction). The locating block 121 of the first movable plate 120 and the locating block 121 of the second movable plate 22 need to be matched with the connector 180. With the increase of the number of positioning slots 117, the number of locating blocks 121 of the first movable plate 120 and the second movable plate 122 will also increase accordingly, and the driving force generated by the armature 150 will be more evenly transmitted to the movable plate, resulting in better braking effect.

Figure 13:
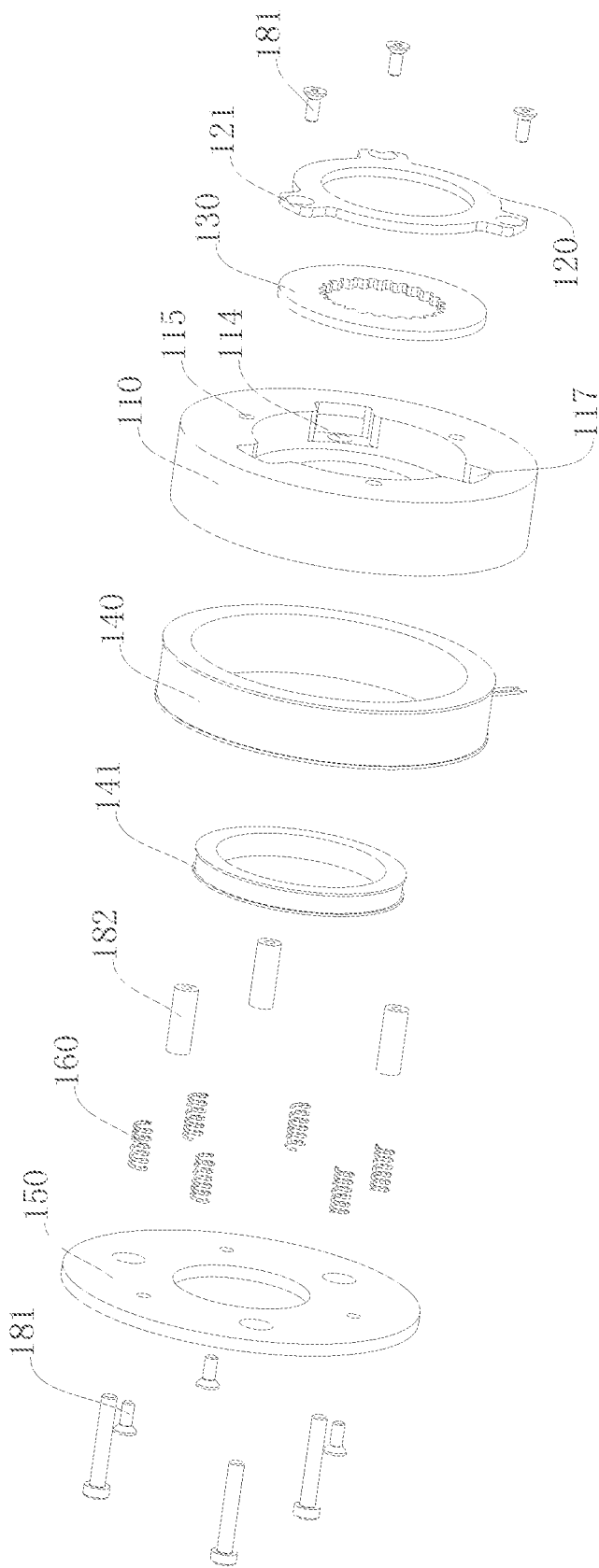
FIG. 13 is a schematic explosive structural diagram 2 of the brake provided by one embodiment of the present application.
Figure 14:
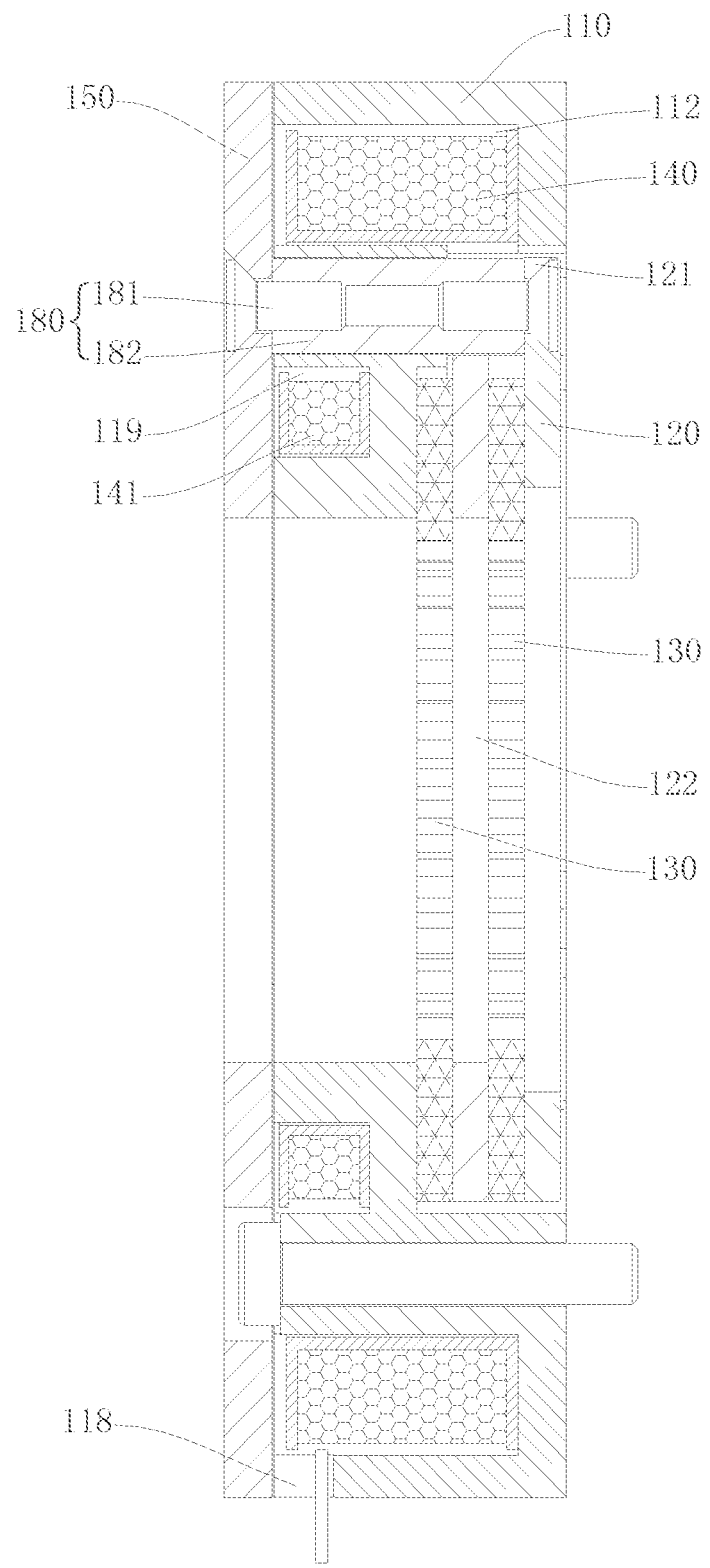
FIG. 14 is a schematic sectional structural diagram 1 (same perspective as FIG. 10) of the brake provided by one embodiment of the present application.
Figure 15:
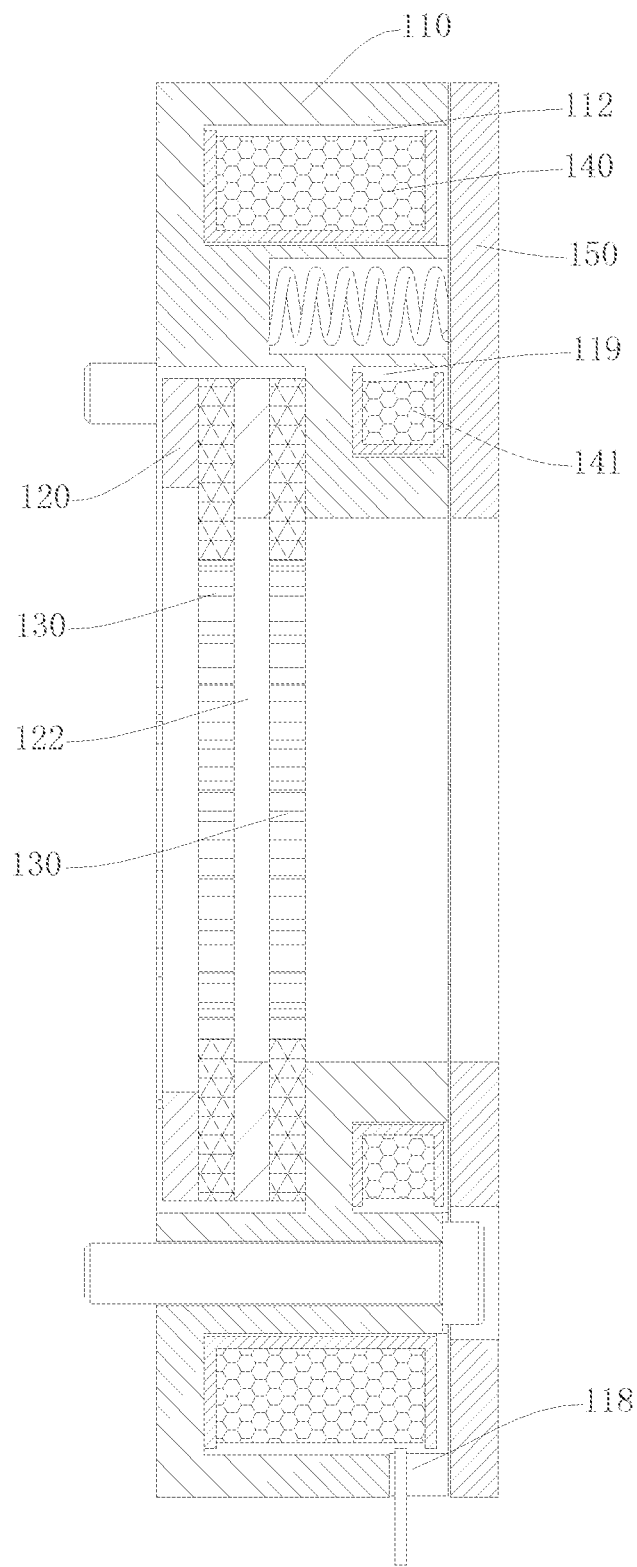
FIG. 15 is a schematic sectional structural diagram 2 (same perspective as FIG. 11) of the brake provided by one embodiment of the present application.
Figure 16:
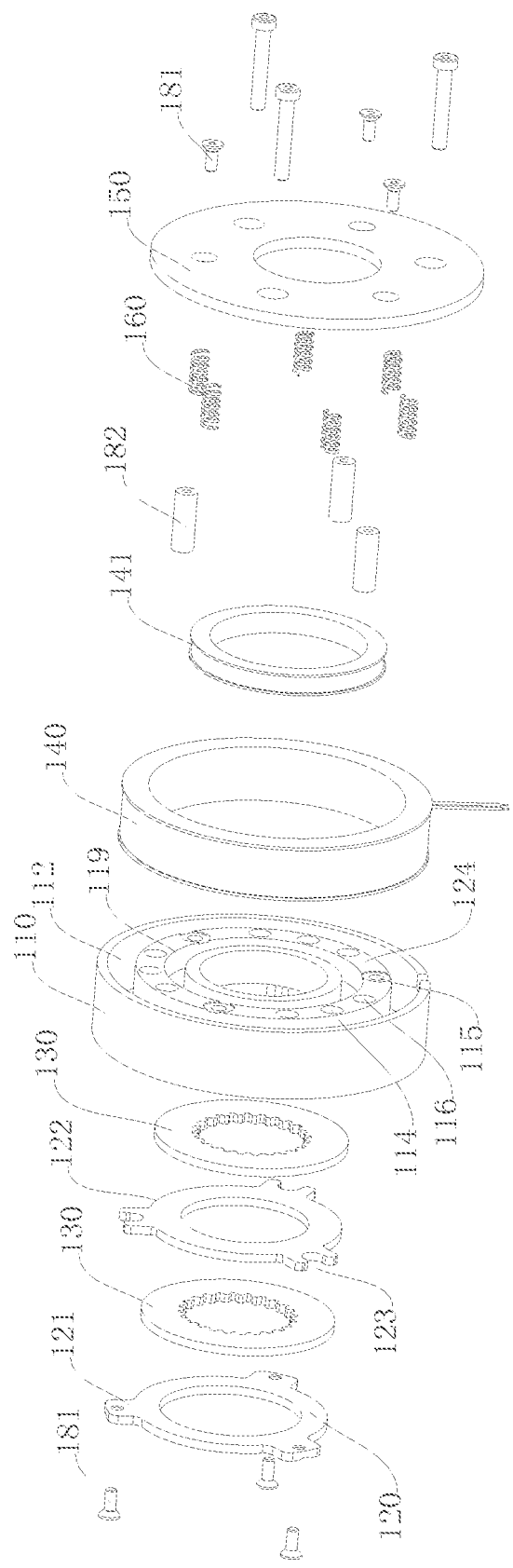
FIG. 16 is a schematic explosive structural diagram 1 of the brake provided by one embodiment of the present application.
Figure 18:
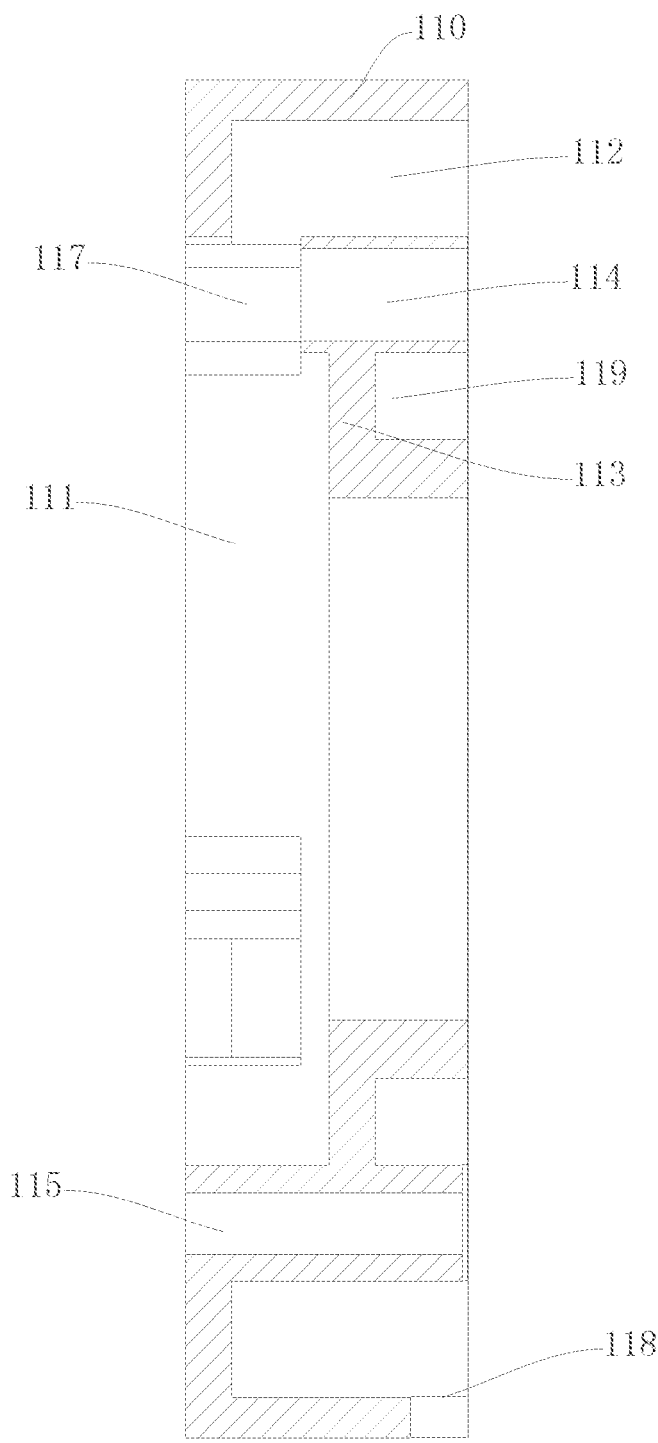
FIG. 18 is a schematic sectional structural diagram of the magnetic iron core adopted by one embodiment of the present application.

As shown in FIG. 13, FIG. 17 and FIG. 18, the positioning slot 117 is close to the second mounting space 112 and the third mounting space 119. Accordingly, the coil located in the second mounting space 112 and the third mounting space 119 is also close to the positioning slot 117. In this case, since the magnetic conductive material is removed from the positioning slot 117, which may have a negative impact on the magnetic circuit, the number of positioning slot 117 should not be too large. Not only the number of positioning slot 117, but also the depth of positioning slot 117 will have a negative impact on the magnetic circuit. If the radial width of the mounting area 124 is large, the distance between the positioning slot 117 and the two mounting spaces (the second mounting space 112 and the third mounting space 119) and the coils located in the two mounting spaces is far, or the depth of the positioning slot 117 is small, in other embodiments, the positioning slot 117 may be other structures. For example, the positioning slot 117 may no longer be an independent and separate slot as shown in FIG. 13 and FIG. 17, but an annular slot around the middle of the magnetic yoke iron core 110 and coaxial with the magnetic yoke iron core 110. The structural form of the positioning slot 117 can be flexibly designed according to its application environment.

In some embodiments, an improved embodiment of the magnetic yoke iron core 110 may adopt the structure shown in FIG. 9-FIG. 17. Refer to FIG. 9-FIG. 17, an annular mounting area 124 for installing the connector 180 is formed on the magnetic yoke iron core 110. The mounting area 124 is located between the first mounting space 111 and the second mounting space 112, that is, along the radial direction, the first mounting space 111 is located on the innermost side, the second mounting space 112 is located on the outermost side, and the mounting area 124 is located between them. The mounting area 124 is also provided with at least one mounting hole 115, which is arranged alternately with the at least one connector 180. When installing the brake, the user may insert a bolt into the mounting hole 115 and install the brake to an external object through the bolt to realize the installation. The at least one mounting hole 115 and the at least one connector 180 are arranged alternately, which can ensure the firm installation of the brake, so as to have good stability when in use.

When the bake is mounting to an external object, the end surface of the first shaft end may be used as the mounting flange face. The brake may be fixed to an external object by connecting parts such as bolts, pins and rivets threaded into the mounting hole 115. At this time, the end surface of the first shaft end is close to the external object. In addition, the second shaft end may be used to install the brake. When the brake is installed with the second shaft end, a convex stand needs to be set at the second shaft end to leave axial movement space for the armature iso. The convex stand may be arranged on the magnetic yoke iron core 110 and protrude to the outside of the magnetic yoke iron core 110 along the thickness direction of the magnetic yoke iron core 110. The projection height of the convex stand is greater than the sum of the thickness of the armature 150 and the axial moving distance of the armature 150. The convex stand may also be an integral structure with the magnetic yoke iron core 110 or a split structure. The convex stand may also be a separate part and may also be arranged on an external object. The convex stand may be an integral structure with the external object or a split structure with the external object.

In this embodiment, the connector 180 is located in the connecting hole 114. The at least one mounting hole 115 and the at least one connector 180 are arranged alternately, that is, the at least one mounting hole 115 and the at least one connecting hole 114 are arranged alternately. As an alternative embodiment, the at least one mounting hole 115 may not be arranged alternately with the at least one connecting hole 114, but the alternating arrangement in this embodiment is more conducive to the stability of the brake during operation.

In other embodiments, the mounting hole 115 may not be in the mounting area 124. For example, the mounting hole 115 may be located in the outer ring of the magnetic yoke iron core 110. Alternatively, a portion extending outward in the radial direction may be arranged on the edge of the magnetic yoke iron core 110, and the mounting hole 115 may be arranged on the portion extending outward. The position of the mounting hole 115 is related to factors such as the installation environment of the brake. The technical scheme of modifying the position of the mounting hole 115 and the structure according to the installation environment and other factors is within the protection scope of this application.

In some embodiments, an improved embodiment of the magnetic yoke iron core 110 may adopt the structure shown in FIG. 9-FIG. 18. Refer to FIG. 9-FIG. 18, the side of the first mounting space 111 close to the second shaft end has an extending portion 113. The extending portion 113 extends from the inner wall to the center of the magnetic yoke iron core 110. In general, the extending portion 113 is in the shape of an annular plate, and the inner diameter of the extending portion 113 is less than the outer diameter of the friction disk 130. When the brake has only one friction disk 130, the extending portion 113 and the first movable plate 120 are located at both ends of friction disk 130 respectively. Then, in the power-off state, the armature 150 drives the first movable plate 120 to approach and squeeze the friction disk 130. The two shaft end surfaces (i.e. the surfaces on both sides) of the friction disk 130 rub with the first movable plate 120 and the extending portion 113 respectively to realize braking. When the brake has two or more friction disks 130, the extending portion 113 and the first movable plate 120 are located at both ends of all friction disks 130 respectively (that is, all friction disks 130 are located between the extending portion 113 and the first movable plate 120). Then, in the power-off state, the armature 150 drives the first movable plate 120 to approach and squeeze the adjacent friction disk 130, which squeezes the second movable plate 122, and the second movable plate 122 squeezes another friction disk 130 (assuming that the number of friction disks 130 is two or more). Therefore, the two shaft end surfaces of the friction disk 130 have three contact states: (1) one end surface of the friction disk 130 rubs with the first movable plate 120, and the other end surface rubs with the second movable plate 122; (2) both end surfaces of the friction disk 130 rub against the second movable plate 122 (in this case, the number of the second movable plate 122 is two or more); (3) one end surface of the friction disk 130 rubs with the second movable plate 122, and the other end surface rubs with the extending portion 113. No matter which of the above three states, the two end surfaces of each friction disk 130 can rub and generate braking force.

A structure clamping the friction disk 130 in cooperation with the first movable plate 120 is mentioned in the first embodiment, but the specific implementation of the structure is not limited. The extending portion 113 is a specific implementation of the structure in this embodiment. The extending portion 113 may be integrally formed with the magnetic yoke iron core 110, or may be an independent part fixedly mounted to the magnetic yoke iron core 110. When the extending portion 113 is machined integrally with the magnetic yoke iron core 110, the extending portion 113 has a high forming accuracy. The fitting accuracy between the extending portion 113 and the friction disk 130 is high and the friction effect is good.

Preferably, the side of the extending portion 113 close to the axis of the magnetic yoke iron core 110 protrudes towards the second shaft end and is provided with an annular protrusion. The annular protrusion is surrounded by the inner wall of the magnetic yoke iron core 110 to form a third mounting space 119, which is compact in structure.

The armature 150 of the brake provided in the present application does not contact and rub with the friction disk 130. Therefore, the brake provided in the present application has advantages over the traditional brake. It is emphasized here again that in the traditional brake, as shown in FIG. 20, the armature 94 contacts and rubs with the friction disk 96. The armature 94 is made of soft magnetic material. The high temperature and deformation caused by friction would affect the shape and magnetism of the armature 94. After the shape of the armature 94 is changed, it would not rub well with the friction disk 96, thereby adversely affecting the braking. After the magnetism of the armature 94 is changed, it would not be able to be effectively attracted when the coil is energized, which will adversely affect the separation of the armature 94 and the friction disk 96. In the brake provided by this embodiment, the first movable plate 120 and the extending portion 113 are used to replace some functions of the armature 94 and the tail plate 95 of the traditional brake (functions in terms of friction braking). Compared with the armature 94 and the tail plate 95, the first movable plate 120 and the extending portion 113 are easier to design and process, and have higher stability during operation.

In some embodiments, an improved embodiment of the magnetic yoke iron core 110 can adopt the structure shown in FIG. 12-FIG. 16. Refer to FIG. 12-FIG. 16, the mounting area 124 is also provided with at least one blind hole 116 with opening towards the second shaft end. The at least one elastic part 160 is correspondingly installed in the at least one blind hole 116. The number of elastic part 160 and the blind hole 116 is the same. On the annular path where the connecting holes 114 are distributed, blind holes 116 are arranged on both sides of each connecting hole 114. When the first coil 140 and the second coil 141 are powered off, the armature 150 drives the first movable plate 120 (when the second movable plate 122 is set, the first movable plate 120 can also indirectly push the second movable plate 122) to squeeze the friction disk 130 under the action of the elastic part 160. If the blind hole 116 is not provided, the spring (i.e. the elastic part 160, hereinafter referred to as the spring) may be directly arranged between the armature 150 and the magnetic yoke iron core 110. However, in this case, the spring cannot be guided, and the selection specification of the spring will be limited. In this embodiment, when the blind hole 116 is set and the spring is in the blind hole 16, the inner wall of the blind hole 116 can play a certain guiding role when the spring expands and contracts, and the spring may choose a longer specification and have a longer service life.

For example, there is a connecting hole 114 between each two mounting holes 115, and there is a blind hole 116 on both sides of the connecting hole 114, and the blind holes 116 on both sides of the connecting hole 114 are also between the two mounting holes 115. The distribution of the mounting holes 115, the connecting holes 114 and the blind holes 116 may also adopt other forms. The distribution form of the hole structure in the mounting area 124 may be flexibly designed according to the application environment.

The above-mentioned embodiments are only used to illustrate the technical solutions of the disclosure, but not to limit the disclosure. However, these modifications or replacements do not make the essence of the corresponding technical solutions deviate from the spirit and scope of the technical solutions of the embodiments of the present application, and should be included within the protection scope of the present application.

What is claimed is:

1. A friction disk comprising an elastic component and a plurality of friction monomers;

wherein:

the plurality of friction monomers are distributed in an annular array and enclosed to form a central space, each of the plurality of friction monomers being movable towards or away from the central space along a radial direction of the annular array, the elastic component being connected with the plurality of friction monomers, respectively, and the elastic component being configured with a pre-tightening force to make the plurality of friction monomers close to the central space;

the elastic component comprises:
a fixed frame located in the central space, the fixed frame forming a space within for adapting a shaft sleeve; and a second tension spring group connected between the plurality of friction monomers and the fixed frame, the second tension spring group comprising at least one second tension spring; and the elastic component further comprises at least one guide element having an end fixedly connected to the fixed frame, the at least one guide element extending along the radial direction of the annular array, and a chute slidably matched with the at least one guide element being arranged on one side of at least one friction monomer that faces the central space.

2. The friction disk according to claim 1, wherein each of the at least one guide element is arranged in a middle position of one side of a friction monomer of the plurality of friction monomers that faces the central space.

3. The friction disk according to claim 1, wherein one side of each of the plurality of friction monomers facing the central space comprises a second accommodating groove, two ends of the at least one second tension spring being respectively fixedly connected to a groove bottom of the second accommodating groove and a peripheral surface of the fixed frame.

4. The friction disk according to claim 1, further comprising a boss arranged on one side of each of the plurality of friction monomers that faces away from the central space.

5. A brake comprising:
a friction disk comprising an elastic component and a plurality of friction monomers, the plurality of friction monomers being distributed in an annular array and enclosed to form a central space, each of the plurality of friction monomers being movable towards or away from the central space along a radial direction of the annular array, the elastic component being connected with the plurality of friction monomers, respectively, and the elastic component being configured with a pre-tightening force to make the plurality of friction monomers close to the central space;
a magnetic yoke iron core comprising a first mounting space and a second mounting space distributed sequentially and concentrically from inside to outside of the magnetic yoke iron core, the first mounting space penetrating through a center position of the magnetic yoke iron core in an axial direction of the magnetic yoke iron core, an opening of the second mounting space facing a second shaft end of the magnetic yoke iron core, the magnetic yoke iron core further comprising at least one third mounting space coaxially arranged with the second mounting space, and an opening of each one of the at least one third mounting space facing the second shaft end of the magnetic yoke iron core;
a first movable plate located in the first mounting space and close to a first shaft end of the magnetic yoke iron core, the first shaft end being an opposite end of the second shaft end, and the friction disk being located in the first mounting space and being located at a side of the first movable plate close to the second shaft end;
a first coil arranged in the second mounting space;
at least one second coil correspondingly arranged in the at least one third mounting space;
an armature located at the second shaft end of the magnetic yoke iron core, the armature being connected with the first movable plate through at least one connector, the at least one connector passing through the magnetic yoke iron core and being slidably matched with the magnetic yoke iron core, and the armature being configured to drive the first movable plate to move along the axial direction of the magnetic yoke iron core; and an elastic part arranged between the armature and the magnetic yoke iron core, the elastic part having a pre-tightening force that enables the armature to be far away from the magnetic yoke iron core.

6. The brake according to claim 5, wherein the first coil and the at least one second coil are connected in series, and are configured to operate in an on state or an off state under control of a same control switch; or
the first coil and the at least one second coil are connected in parallel, and are configured to operate in the on state or the off state under control of different control switches.

7. The brake according to claim 5, further comprising:
a plurality of friction disks sequentially arranged in the first mounting space along the axial direction of the magnetic yoke iron core, the plurality of friction disks being located at a side of the first movable plate close to the second shaft end; and
at least one second movable plate, each one of the at least one second movable plate being arranged between two adjacent friction disks of the plurality of friction disks, and the at least one second movable plate being connected with the at least one connector.

8. The brake according to claim 7, wherein each one of the at least one connector comprises a guide pole and two connecting parts, the guide pole passing through the magnetic yoke iron core, one end of the guide pole being connected to the first movable plate through one of the two connecting parts, the other end of the guide pole being connected to the armature through the other one of the two connecting parts, and the at least one second movable plate being slidably connected to the guide pole.

9. The brake according to claim 5, further comprising at least one positioning slot formed on an end surface of the first shaft end of the magnetic yoke iron core, the at least one positioning slot being connected to the first mounting space, and the at least one connector correspondingly passing through the at least one positioning slot; and
wherein an outer circumference of the first movable plate is provided with at least one locating block corresponding to the at least one positioning slot, the at least one positioning slot being configured to avoid the at least one locating block, and the at least one connector being connected to the at least one locating block.

10. The brake according to claim 5, further comprising an annular mounting area for mounting the at least one connector formed on the magnetic yoke iron core, the annular mounting area being between the first mounting space and the second mounting space; and
wherein the annular mounting area is provided with at least one mounting hole, and the at least one mounting hole is arranged alternately with the at least one connector.

11. The brake according to claim 5, wherein an inner side surface of the first mounting space close to the second shaft end is provided with an extending portion extending towards an axis of the magnetic yoke iron core, and an inner diameter of the extending portion is less than an outer diameter of the friction disk.

12. The brake according to claim 5, wherein the elastic component comprises a plurality of first tension spring groups, each of the plurality of first tension spring groups being connected between two adjacent friction monomers, each of the plurality of first tension spring groups comprising at least one first tension spring, and the central space forming a space for adapting a shaft sleeve.

13. The brake according to claim 12, wherein two adjacent surfaces of the two adjacent friction monomers are respectively provided with at least one first accommodating groove; and two ends of each of the at least one first tension spring are respectively connected to a groove bottom of a first accommodating groove of the two adjacent friction monomers.

14. The brake according to claim 5, wherein the elastic component comprises:
   a fixed frame located in the central space, the fixed frame forming a space within for adapting a shaft sleeve; and
   a second tension spring group connected between the plurality of friction monomers and the fixed frame, the second tension spring group comprising at least one second tension spring.

15. The brake according to claim 5, wherein each of the second mounting space and the at least one third mounting space is provided with a wiring opening in communication with outside; an outgoing line of the first coil extends out through the wiring opening of the second mounting space; and an outgoing line of each one of the at least one second coil extends out through the wiring opening of each one of the at least one third mounting space.

\* \* \* \* \*